Figure 12B:
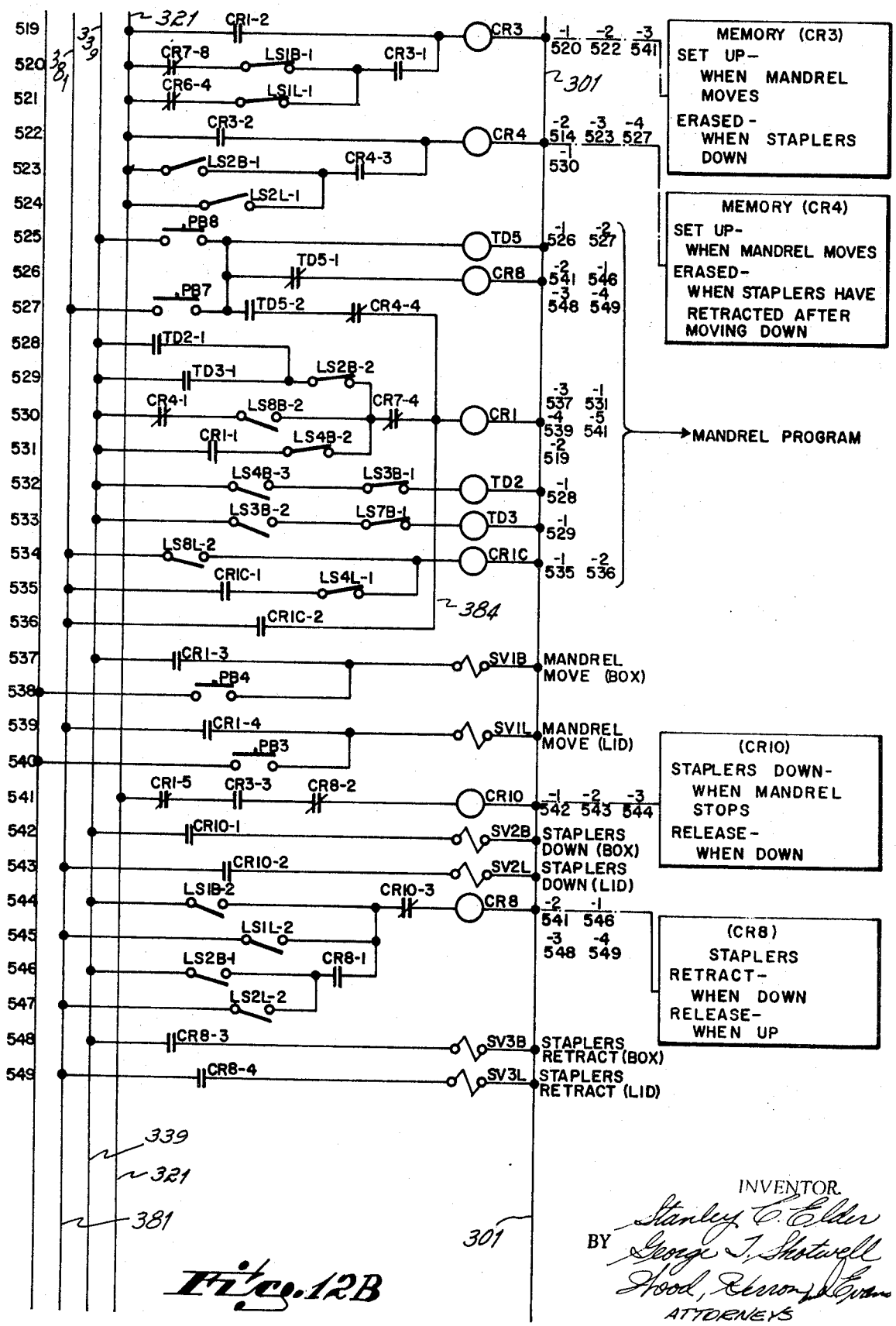
Figure 12G:
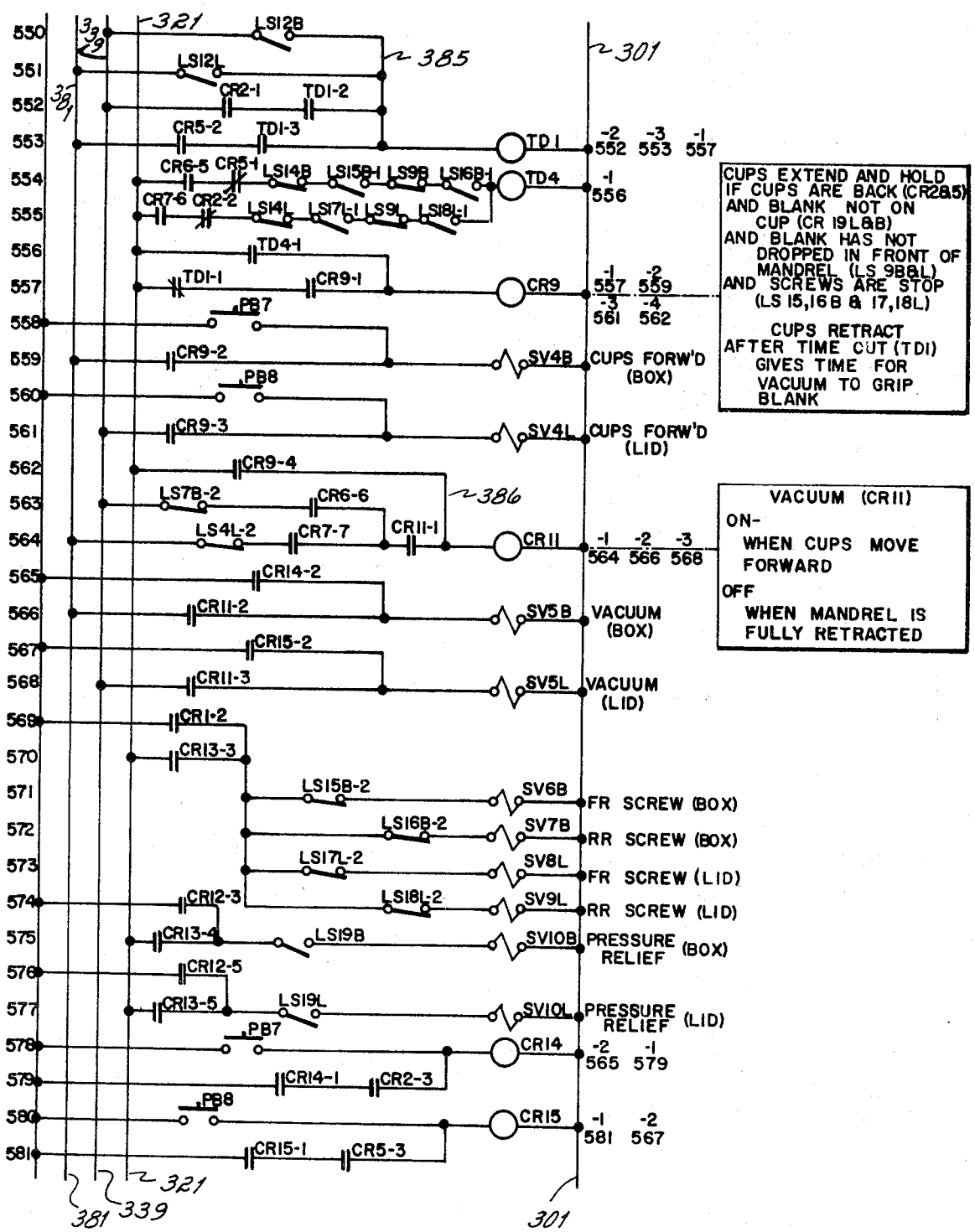

United States Patent

[11] 3,583,295

| [72] | Inventors | Stanley C. Elder<br>Cincinnati, Ohio;<br>George T. Shotwell, Covington, Ky. |
|---|---|---|
| [21] | Appl. No. | 775,685 |
| [22] | Filed | Nov. 14, 1968 |
| [45] | Patented | June 8, 1971 |
| [73] | Assignee | A. R. Industries Inc.<br>Cincinnati, Ohio |

[54] CARTON ERECTION MACHINE
19 Claims, 14 Drawing Figs.

[52] U.S. Cl. ................................................ 93/51,
93/36.3, 93/55.1, 93/59, 227/20, 227/50
[51] Int. Cl. ........................................... B31b 1/44,
B31b 1/68, B31b 17/74
[50] Field of Search ................................... 93/36.3,
39.1 P, 49.1, 51, 51.1, 83, 94 PX, 59, 55.1;
227/20, 50, 103

[56] References Cited
UNITED STATES PATENTS

| 1,438,252 | 12/1922 | Milmoe | 93/51X |
| 2,320,684 | 6/1943 | Van Saun | 93/55.1 |
| 2,350,278 | 5/1944 | Hines | 93/55.1 |
| 2,361,942 | 11/1944 | Hothersall | 227/20 |
| 2,620,711 | 12/1952 | Lindsay | 93/51 |
| 2,774,287 | 12/1956 | Goss | 93/51 |
| 2,794,373 | 6/1957 | Lindsay | 93/51 |
| 2,896,518 | 7/1959 | Gibb | 93/51 |
| 2,904,789 | 9/1959 | Radin | 227/103X |
| 2,995,755 | 8/1961 | Hines | 227/103X |
| 2,997,830 | 8/1961 | Nelson | 93/51X |
| 3,065,679 | 11/1962 | Clement | 93/51 |
| 3,421,416 | 1/1969 | Benzon-Petersen | 93/51.1 |
| 3,464,327 | 9/1969 | Yovanovich | 93/83 |
| 3,476,023 | 11/1969 | Fuller | 93/39.1 |
| 3,477,349 | 11/1969 | Berney | 93/55.1 |
| 3,478,653 | 11/1969 | Byrne | 93/59 |

*Primary Examiner*—Wayne A. Morse, Jr.
*Attorney*—Wood, Herron and Evans

ABSTRACT: A machine for erecting cut and scored carton blanks, such as flat cut and scored waxed corrugated board containers. The machine is a dual or double machine in that it is operable to simultaneously feed and erect carton bottoms and carton lids, thereby eliminating the need to inventory one while erecting the other or to utilize two machines, one for lids and one for bottoms. It comprises a pair of magazine conveyors for feeding carton lid blanks and carton bottom blanks to a pair of feed stations, a pair of feed stations for supplying the blanks to a pair of erection stations, and a pair of stapling stations where the lids and bottoms are stapled together into erected trays.

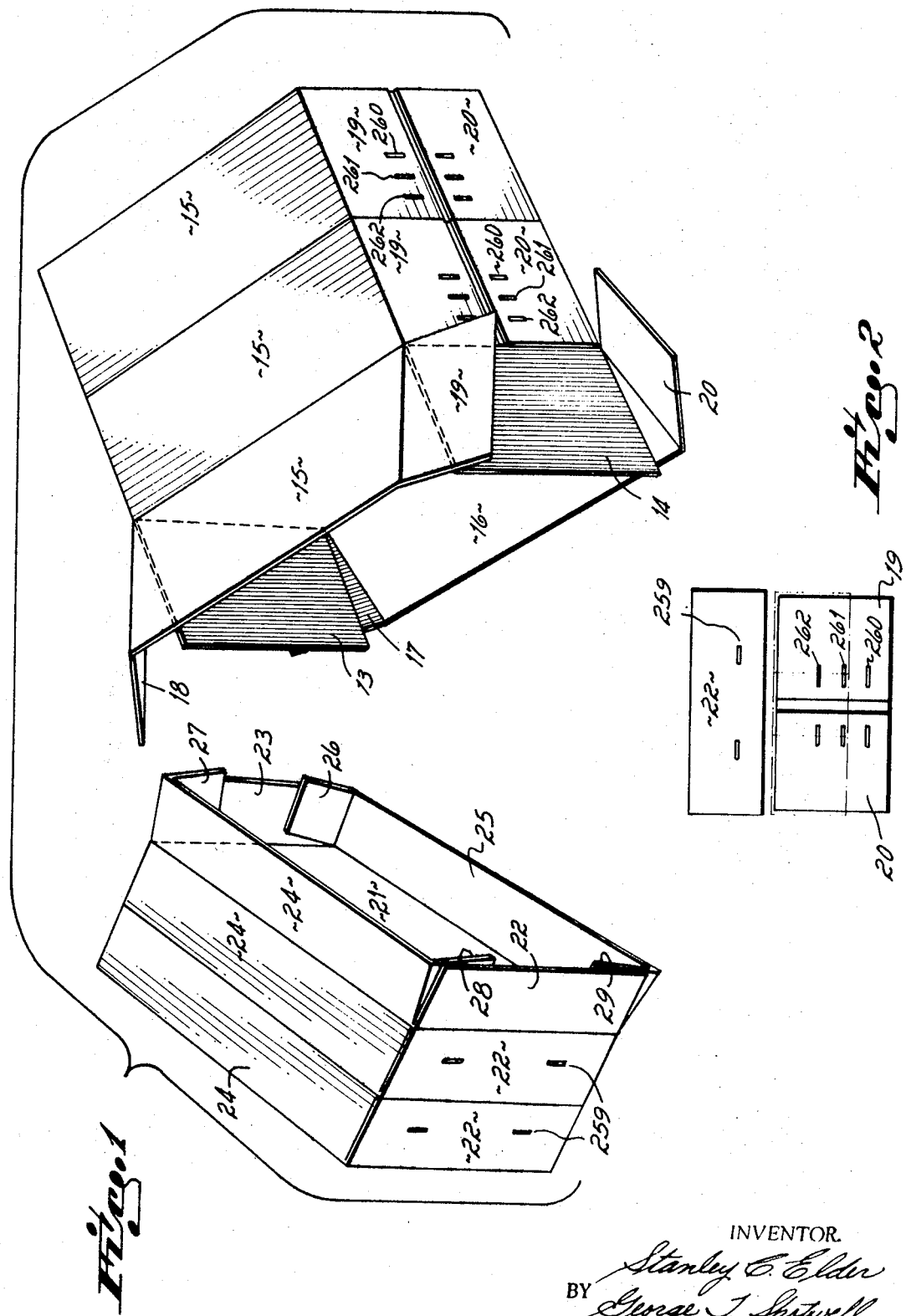

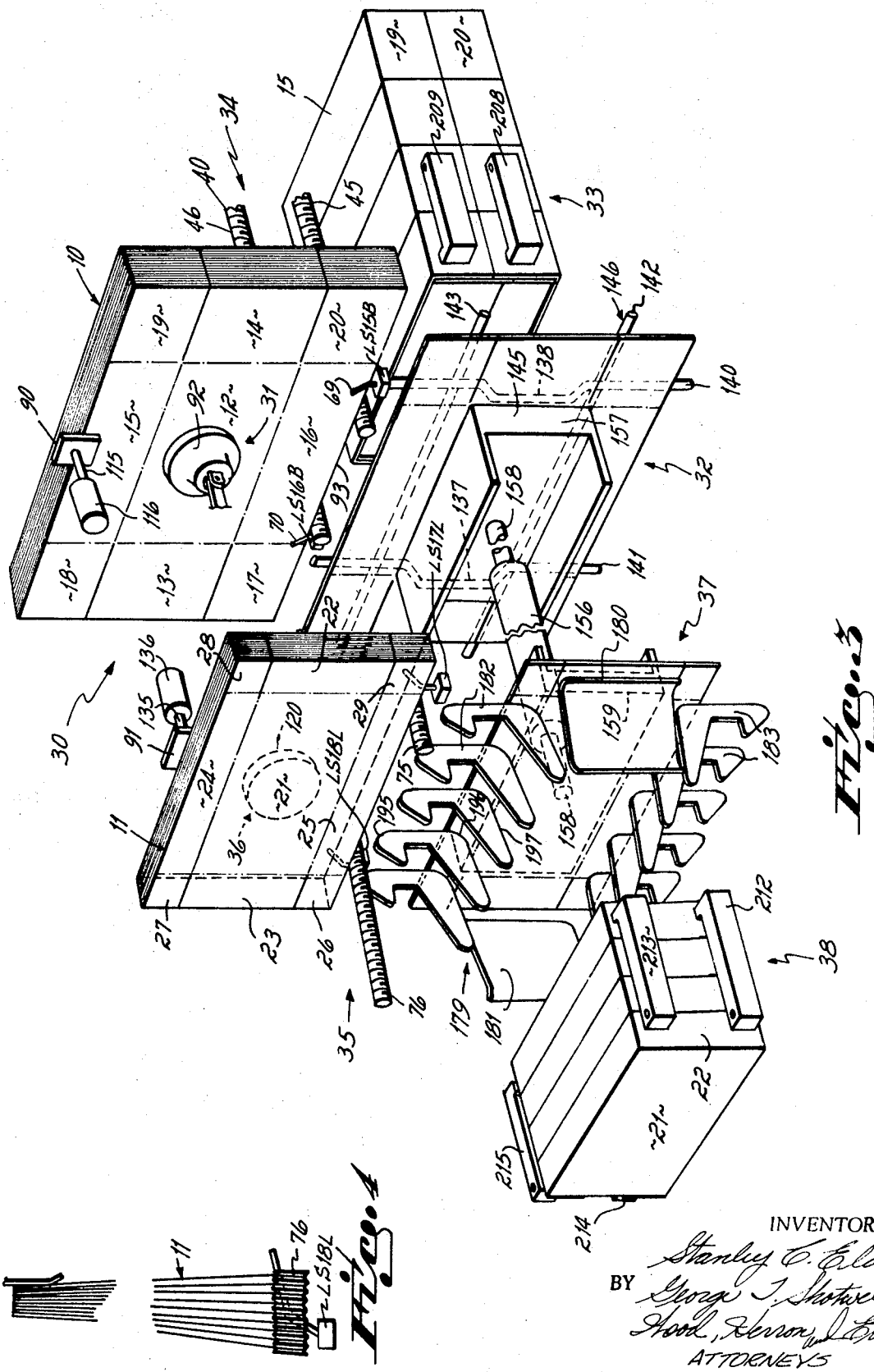

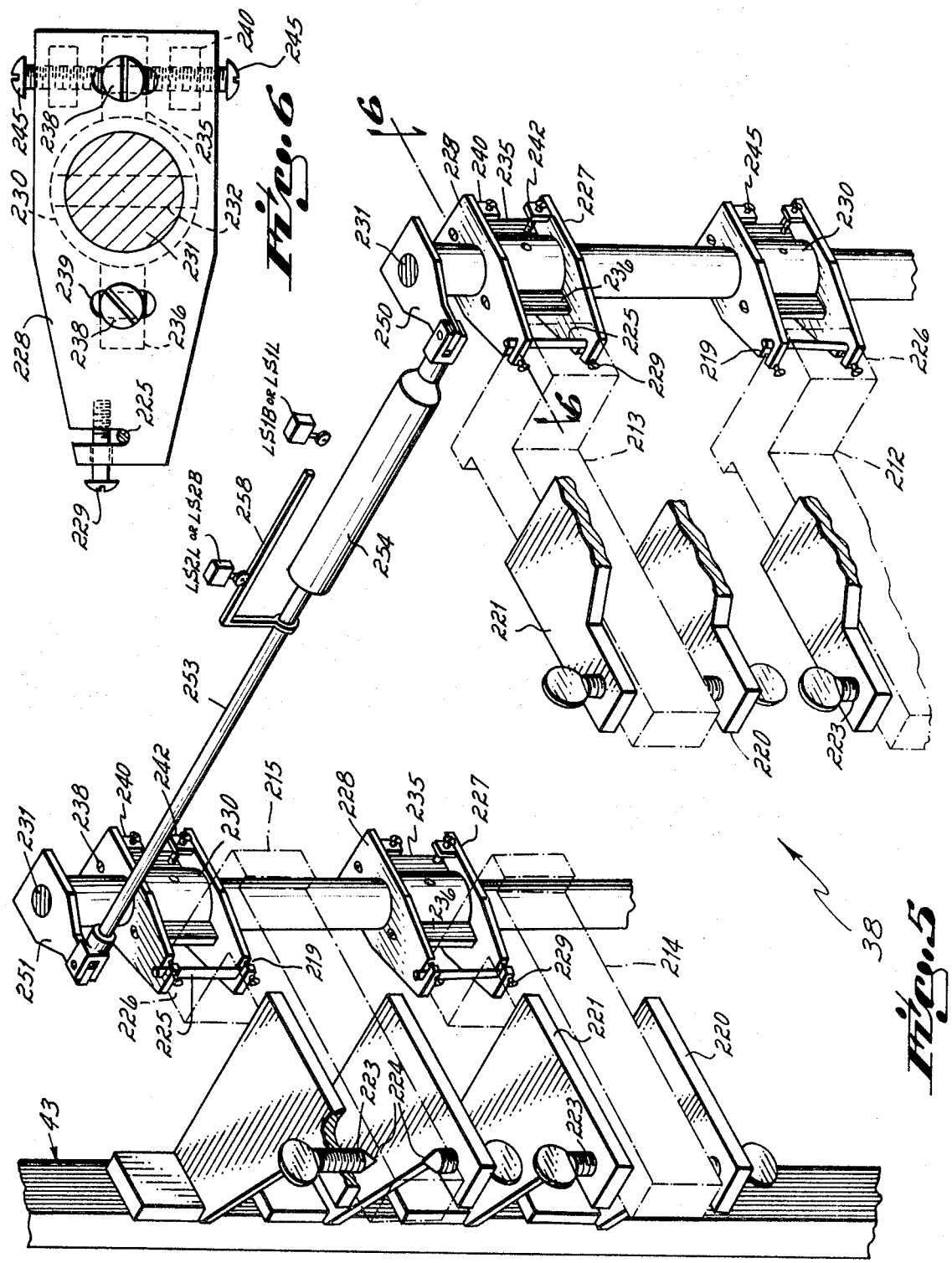

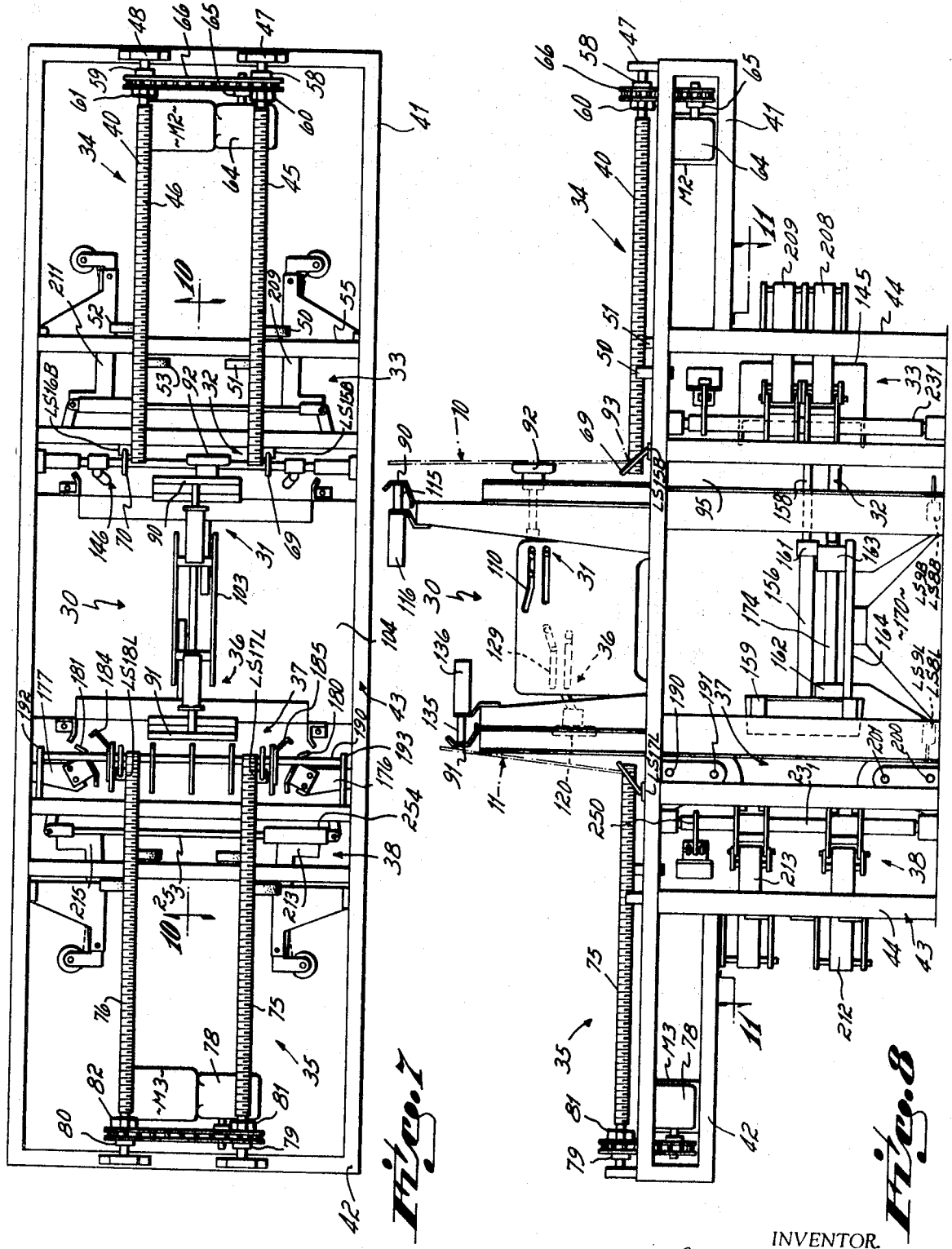

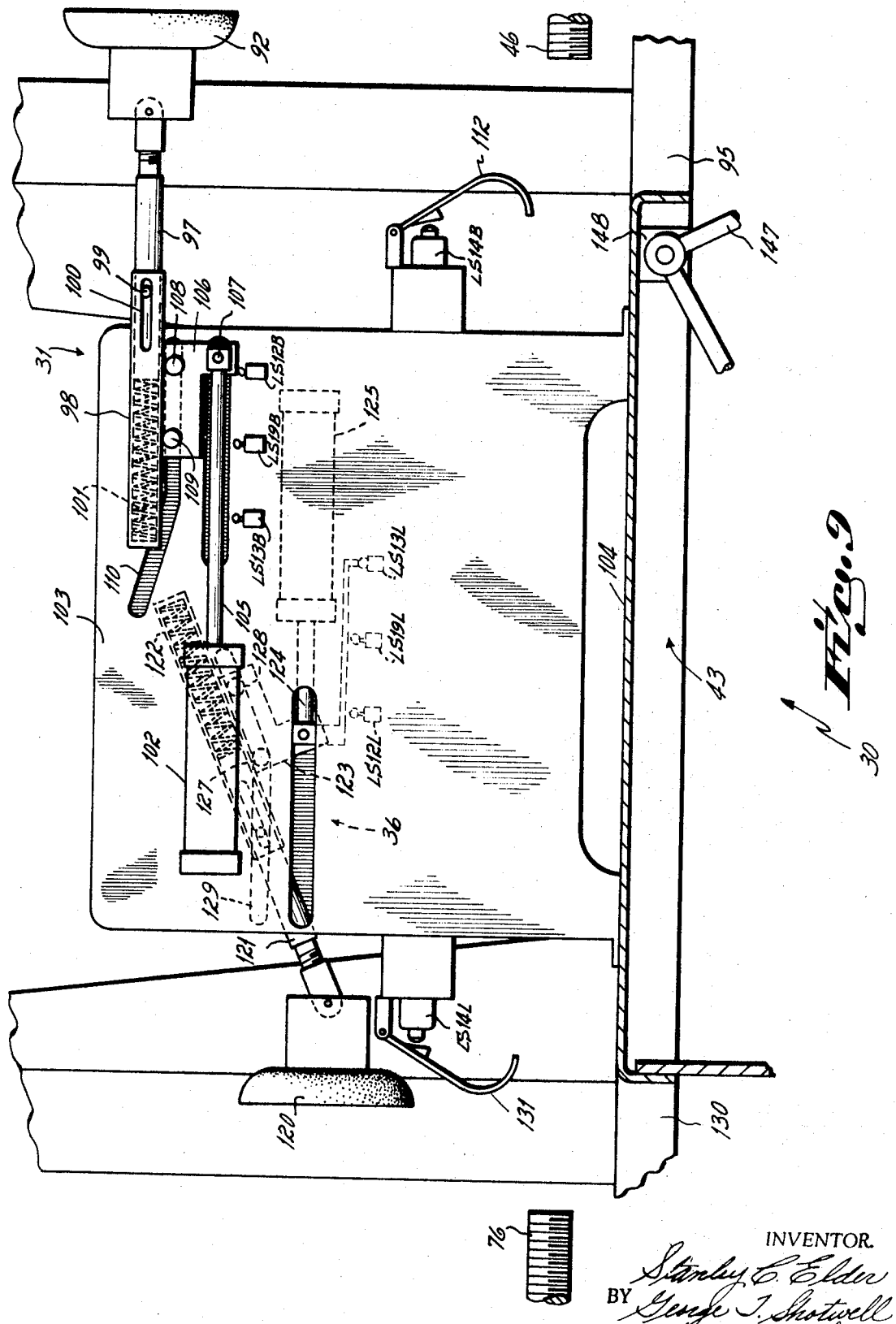

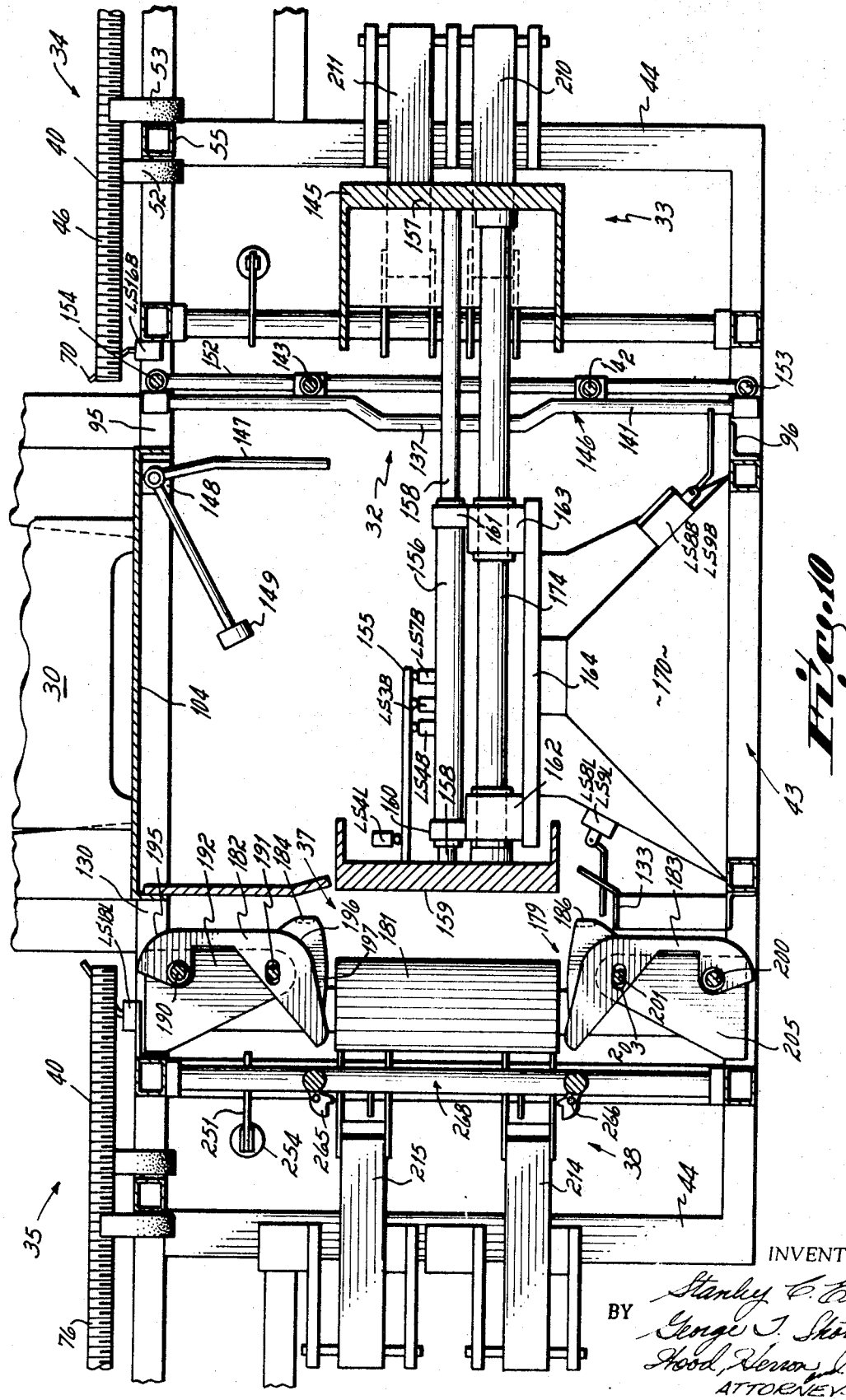

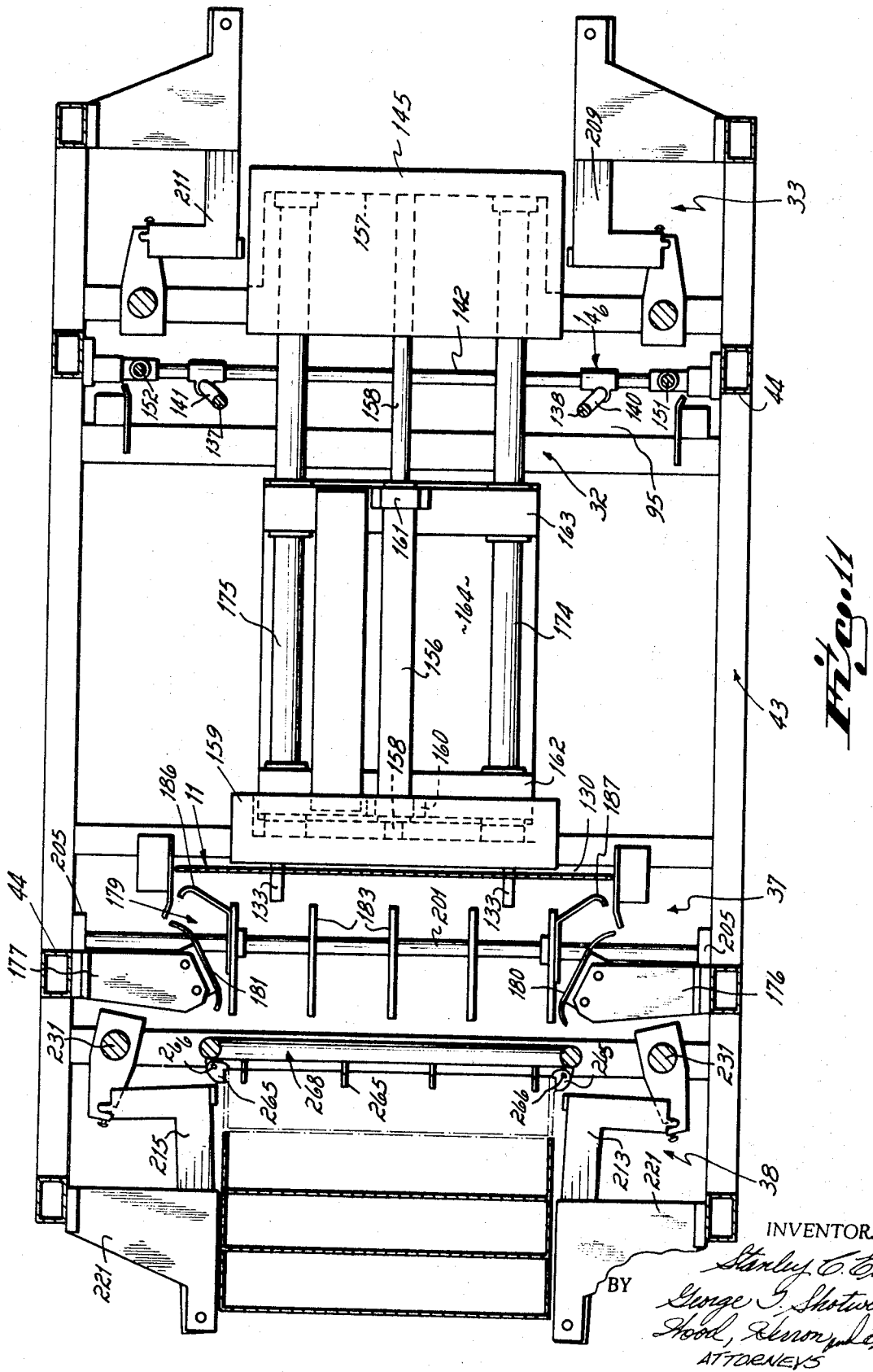

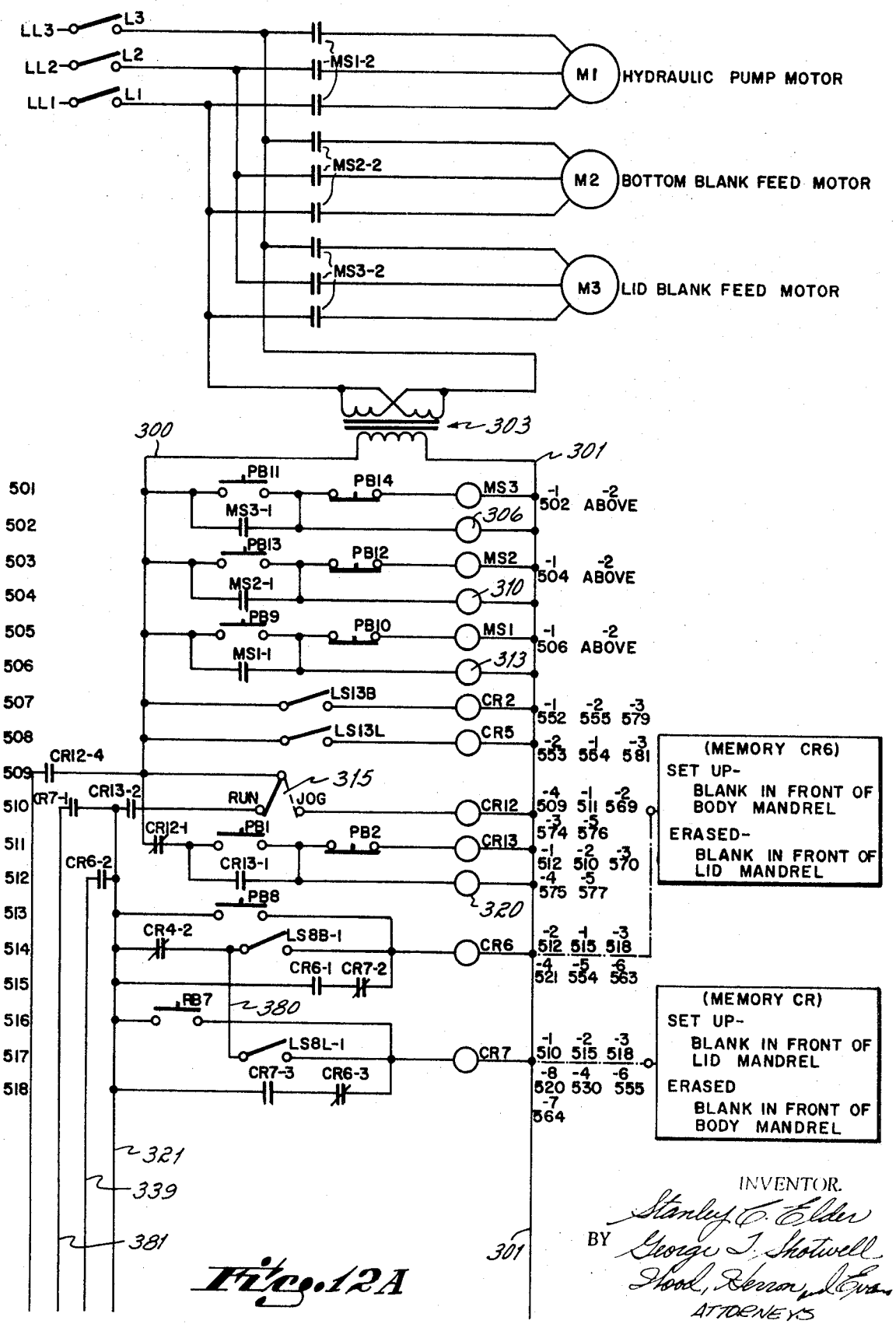

CARTON ERECTION MACHINE

This invention relates to a machine for supplying, feeding, erecting and stapling carton blanks into assembled cartons, and particularly, to a machine for simultaneously forming and assembling wax coated corrugated carton blanks into carton lids and carton bottoms.

Waxed corrugated board containers are used to package numerous products and particularly food products such as poultry and fish. Customarily, these containers are manually erected in the factory when the container is filled, such as a poultry or fish processing plant. There is currently available on the market a machine for erecting these cartons but it is a single purpose machine, capable only of erecting either carton lids or carton bottoms but not both unless there is a complete resetup of the machine. The result is that a food processor who wishes to convert from manual to automatic carton setup must either buy two of those machines, one for carton bottoms and the other for lids, or he must have available a great deal of excess space to store an inventory of erected bottoms while the machine sets up lids and vice versa. Manifestly, both limitations severely restrict conversion to an automatic setup.

It has therefore been a principal objective of this invention to provide a single machine which is capable of simultaneously erecting both corrugated carton lid blanks and carton bottom blanks. By providing a single machine to erect both, the necessity for a large inventory of one or the other is minimized and the total cost of machinery required to erect both is substantially reduced from the cost of two machines.

Another objective of this invention has been to provide an improved carton erection machine magazine for storing a large inventory of carton blanks and feeding them to a carton erection mechanism. This improved magazine enables the machine to operate for an extended period of time without the attention of a machine operator who otherwise would be required to regularly refill the magazine with blanks.

Still another objective of this invention has been to provide an improved feeder mechanism for sequentially feeding carton blanks from a magazine to a carton erection station. This mechanism is operable to feed the cartons into the carton erection station without scarring or tearing the carton blanks and without jamming in the event of an oversize or undersize blank being fed into the machine.

Another objective of this invention has been to provide a machine which operates alternately to form a carton lid and then a carton bottom. This alternate forming enables the number of lids and the number of bottoms formed on the machine to always be maintained equal so that there is never an excessive number of formed lids or bottoms. By operating alternately on the lids and bottoms, the power requirements of the machine are substantially reduced over what they would be if the two were formed simultaneously. This power requirement is particularly critical when forming large heavy corrugated board containers such as those commonly used to pack food products.

Generally, the machine which accomplishes these objectives comprises a pair of magazine sections, a pair of feed stations, a pair of opposed carton erection stations, and a pair of stapling stations. By locating the erection stations in opposed relationship, a single double ended reciprocal mandrel may be used to form first a carton bottom blank as the mandrel moves in one direction and then a carton lid as the mandrel moves in the opposite direction.

The magazines for supplying both lids and bottom blanks to the respective feed stations comprises a pair of lead screws which are independently rotatable so as to enable one or the other sides of the forwardmost carton in the magazine to be moved forwardly independently of the other side. Feeler switches are located adjacent the forward ends of the lead screws and operate to control rotation of the screw adjacent which the switch is located. Consequently, both screws operate in unison to feed carton blanks forwardly on the conveyor and the screws function independently to correct skew of the carton blanks on the conveyor.

The carton feeder mechanism comprises a suction cup operable to grasp the forwardmost carton on the conveyor and pull it forwardly and downwardly into the top of a carton erection station. The suction cup then releases the carton blank and allows it to drop vertically into the erection station. A mandrel then pushes the blank through a forming frame so that the blank is forced into a tray configuration which is then pushed through a stapling station at which staples are inserted into the blanks. During the stapling operation, the mandrel acts as the anvil for the staple guns. The formed cartons are then pushed out of the machine by the next following carton bottom or lid.

The primary advantage of this machine is that it enables both the carton lids and the carton bottoms to be alternately formed on the same machine, thereby automatically maintaining the same number of formed carton lids and carton bottoms. Additionally, the use of a single machine for this purpose minimizes the capital investment required to automate what has heretofore been commonly a manual operation.

These and other objectives of the invention will be more readily apparent from the following description of the drawings in which:

FIG. 1 is a perspective view of a series of erected carton bottoms and carton lids as they emerge from the machine of this invention, FIG. 2 is a side elevational view of a single carton bottom and lid formed upon the machine of this invention, FIG. 3 is a diagrammatic perspective view of the machine, FIG. 4 is a side elevational view of a portion of the carton magazine feed conveyor of the machine, FIG. 5 is a perspective view of the lid stapling mechanism of the machine, FIG. 6 is a cross-sectional view through a carton stapler adjustment mechanism taken along line 6—6 of FIG. 5, FIG. 7 is a top plan view of the carton erecting machine, FIG. 8 is a side elevational view of the machine, FIG. 9 is an enlarged side elevational view of the carton lid and carton bottom feed stations of the machine, FIG. 10 is a cross-sectional view taken along line 10—10 of FIG. 7 illustrating the carton lid and carton bottom erection stations, FIG. 11 is a cross-sectional view taken along line 11—11 of FIG. 8 further illustrating the carton erection stations, and FIGS. 12A—12C illustrate a circuit diagram of an electrical circuit for controlling and cycling the machine of this invention.

Referring to FIGS. 1, 2 and 3, it will be seen that the machine of this invention is operable to simultaneously feed carton bottom blanks 10 and carton lid blanks 11 into carton bottom and carton lid erection stations and to alternately erect first a bottom, then a lid, a bottom and a lid, etc. The erected bottoms and lids are then fed from the erection station into stapling stations from whence the carton bottoms and lids emerge from opposite ends of the machine.

The carton bottom blanks 10 consist of cut and scored flat corrugated blanks, the cut and score lines of which define a bottom panel 12, side panels 13 and 14, front and rear panels 15, 16 and end flaps 18, 19, 20 and 21. After the box bottoms are formed in the machine of this invention, they are configured as trays as may be best seen in FIG. 1 with the end flaps 17, 18, 19 and 20 stapled to the side panels.

The carton lid blanks 11 are generally similar to the carton bottoms 10 except that, when erected, they form shallower trays than the bottoms. These blanks 11 consist of bottom panels 21, side panels 22, 23, front and rear panels 24 and 25, and end flaps 26, 27, 28 and 29. The top panel 21 of the carton lid is slightly larger than the bottom panel 12 of the carton bottom so that the erected and stapled carton lid may be fitted over the erected and stapled carton bottom tray, as illustrated most clearly in FIG. 2.

Generally, the carton bottom erection half of the machine or the right half of the machine as viewed in FIGS. 3, 7 and 8 is functionally identical to the carton lid erection or left half of the machine, as viewed in these figures. The bottom erection end of the machine comprises a magazine 34 for storing and supplying blank bottoms to a blank feed station 30, a feeder mechanism 31 at the feed station 30 for supplying blanks one at a time to an erection station 32, and a stapling station 33 for stapling the formed bottoms together prior to their being pushed out of the machine and onto a feedout conveyor (not shown).

Correspondingly, the lid erection half of the machine comprises a magazine 35 for supplying lid blanks to the feed station 30, a feeder mechanism 36 for sequentially feeding blanks into a lid erection station 37, and a stapling station 38 for stapling together the lids after they have been formed preparatory to their being moved out of the machine onto a lid feedout conveyor (not shown).

MAGAZINE

Both magazines 34, 35 are identical and therefore only the magazine 34 for supplying carton bottom blanks to the feed station 30 will be described in detail, it being understood that an identical magazine is located on the opposite side of the machine for supplying carton lids to the feed station 30.

Each magazine 34, 35 is supported and extends over an outrigger section 41, 42 of the machine frame 43. This frame is made from tubular steel welded together to form a generally rectangular base section 44 which supports the outrigger sections 41, 42.

As may be seen most clearly in FIGS. 3, 7 and 8, the magazine 34 includes a conveyor 40 for transporting flat carton blanks on edge to the feed station 30. This conveyor 40 consists of a pair of parallel lead screws 45, 46 which extend along the top of the magazine 34. Both of these screws 45, 46 are journaled at one end for rotation in journal blocks 47, 48 at the outer end of the outrigger frame 41. Adjacent the opposite ends, one screw 45 is supported for rotation upon a pair of supporting rollers 50, 51 and the other screw 46 is supported for rotation upon a pair of supporting rollers 52, 53. All of the rollers 50, 51, 52, 53 are journaled for rotation upon stub shafts which are in turn mounted upon a crossbar 55 of the frame 53. This supporting arrangement enables the inner ends of the lead screws to be unsupported and extend inwardly in cantilever fashion.

Adjacent the rear of each lead screw 45, 46 a drive sprocket is rotatably journaled thereon. These drive sprockets 58, 59 are drivingly connected to the lead screws 45, 46 through a pair of electric clutches 60, 61, respectively. Consequently, the sprockets are normally free to rotate upon the lead screws but are drivingly connected thereto whenever the electric clutch associated with the sprocket is energized.

The two sprockets 58, 59 are driven from an electric motor M2 through a gear box or gear reduction unit 64, a drive sprocket 65 and a chain 66. The chain 66 extends over both of the sprockets 58, 59 so that rotation of the motor effects rotation of the sprockets 58, 59 through the chain and sprocket drive. Rotation of the sprockets in turn is selectively operable to effect rotation of the lead screws 45, 46 whenever the appropriate electric clutch 60, 61 is energized.

Energization of the two electric clutches 60, 61 is controlled by a pair of feeler switches LS15B, LS16B located adjacent the inner ends of the lead screws 45, 46, respectively. The actuators 69 and 70 of these switches LS15B, LS16B extend above the horizontal plane of the lead screws 45 and 46, respectively and are adapted to be actuated by the blanks fed over the lead screws, as illustrated most clearly in FIGS. 3 and 4. The switches LS15B, LS16B are normally closed and are opened upon contact of a blank 11 with the associated actuator 69, 70. The switches are connected in series with a control circuit to the clutches 60, 61, respectively so that the clutches are energized so long as the switches are closed or, otherwise expressed, until the blank 11 engages the associated feeler 69 and 70 of the switches LS15B, LS16B respectively and effects opening of the switches. This results in opening of the circuit to the associated clutch and thus disconnection of the drive to the lead screw 45 or 46, depending upon which clutch 60, 61 is deenergized.

Because the clutches 60, 61 are operable independently under the control of the switches LS15B, LS16B the lead screws 45, 46 and associated control circuits serve the dual function of feeding carton blanks forwardly over the lead screws to the feed station 30 and of squaring the cartons on the conveyor. In the event that the one side edge of the forwardmost blank on the conveyor leads the opposite edge, the leading side will engage the feeler 69 or 70 before the opposite edge with the result that the screw on the leading side will stop rotation while the opposite screw continues rotation until the lagging side catches up with and engages the feeler associated with the opposite screw. Consequently, the leading carton on the conveyor is always squared up relative to the feeder mechanism 31 at the feed station 30 preparatory to a feeding cycle.

In one preferred embodiment, the machine is used to erect corrugated containers which have a coating of wax applied thereto. This type of container blank has a tendency to stick to adjacent blanks because of a vacuum being formed between the cartons and the adhesive quality of the waxed surfaces. As a result, the leading blank and the blank next following it on the conveyor are prone to stick together and to be pulled off together during the feeding of blanks from the conveyor 34. The use of the feed screws to feed the wax covered corrugated containers on edge up to the feeder station 30 also functions to separate the blanks on the conveyor as illustrated most clearly in FIG. 4. As may be seen most clearly in this figure, the blanks settle between the grooved threads of the lead screw and are spaced apart by the crown of the threads. Consequently, there is no tendency for a vacuum to be formed between adjacent blanks when the leading blank is pulled off of the screw by the feeder mechanism. To this end, we have discovered that a one and one-half inch diameter screw having a pitch of 6 threads per inch is very effective for accomplishing this separating function when the screws are used to convey heavy wax covered corrugated boards to the feeder station.

The magazine 35 for feeding carton lid blanks to the feed station is functionally identical to the magazine 34. Specifically, it comprises a pair of lead screws 75, 76, a drive motor M3, a gear reduction unit 78, a pair of drive sprockets 79 and 80 operable to drive the screws 75, 76 through a pair of electric clutches 81, 82 controlled by a pair of switches LS17L and LS18L, respectively. In the same manner as the lead screws 45 and 46, the lead screws 75 and 76 function to feed carton lid blanks 11 on edge over the screws, to separate or space the carton blanks on the conveyor, and to square the leading blank on the conveyor preparatory to its being fed out of the magazine into the carton erection station.

Carton Blank Feed Mechanism

As may be seen most clearly in FIGS. 3 and 8, the carton bottom blanks 10 slope inwardly when supported upon the lead screws of the two magazines 34 and 35. To this end, the upper edge of the leading carton blank 10 in the magazine is supported by a movable stop 90, which stop is spaced inwardly from the forward end of the lead screws 45 and 46.

Similarly, a movable stop 91 supports the upper leading edge of the forwardmost carton lid blank 11. This stop is also spaced inwardly from the forward end of the lead screws 75 and 76 so that the cartons supported on the conveyor slope inwardly.

The feeder mechanisms 31 and 36 for feeding carton bottom blanks and carton lid blanks out of the magazines 34 and 35 operate alternately; in other words, the mechanisms 31, 36 operate to feed a carton bottom blank 10 into the bottom erection station 32 and then a carton lid blank 11 into the carton lid erection station 37, etc.

The mechanism 31 for removing or feeding a carton bottom blank out of the magazine 34 comprises a movable suction cup 92 operable to pull the leading blank in the magazine inwardly and downwardly so as to move the lower or bottom edge 93 of the forwardmost blank into a vertical slot 95. After the lower edge 93 of the carton has entered this slot 95 (See FIG. 10) and the mandrel is moved out of alignment with the slot 95, vacuum to the cup 92 is released so that the carton bottom blank drops through the slot onto a lower stop 96.

The movable stop 90 moves generally in parallel with the suction cup 92 during extraction of a carton blank from the magazine. Specifically, the stop 90 is moved at a fast rate inwardly simultaneously with the initiation of a downward movement of the suction cup 92. This sudden movement of the stop 90 away from the blank causes the stop to be moved out of contact with the leading edge of the blank as the blank falls inwardly. With the stop 90 out of contact with the leading blank, it is free to be moved inwardly and downwardly by the suction cup 92 into the top of the slot 95 without interference as a consequence of the leading blank being sandwiched between the stop 90 and the next following blank. After the leading blank has been moved by the cup 92 down beneath the horizontal plane of the stop 90, the stop 90 is moved outwardly at a slowed rate to reposition the upper edge of the blank preparatory to the next extraction cycle.

As may be seen most clearly in FIG. 9, the suction cup 92 is fixedly mounted on the outer end of a piston 97. This piston is mounted for reciprocal sliding movement within a cylinder 98. A pin 99 extends into the piston 97 and through a slot 100 of the cylinder so as to secure the piston against rotation within the cylinder. The piston 97 is biased outwardly in the cylinder 98 by a compressing spring 101 mounted within the cylinder between the inner end of the piston and the end of the cylinder.

Reciprocation of the piston 98 is controlled by an expansible type of pneumatic motor 102. The cylinder of this motor is fixedly mounted upon a vertical cam plate 103 which is in turn secured to a transverse horizontal support plate 104 of the machine frame. A piston 105 is movable within the cylinder and has its outer end pivotally secured to a depending plate 106 of the cylinder 98 by a pivot pin 107. A pair of guide rollers 108, 109 are rotatably secured within the plate 106 and are movable within a cam slot 110 machined into the cam plate 103. This cam slot 110 causes the cylinder 98 and the attached cup 92 to be first moved horizontally away from the magazine 34 as the piston 105 is moved inwardly into the cylinder 102 and then to be cammed inwardly and downwardly during further inward movement of the piston. The result is that the suction cup moves first horizontally away from the magazine and then inwardly and downwardly relative thereto so as to pull the forwardmost blank in the magazine away from the next following blank and then downwardly as it continues its movement away from the magazine. As a result of this movement, the lower edge of the blank is pulled inwardly and then downwardly so as to thereby be inserted into the top of the vertical slot 95. As the lower edge of the blank is brought into position above this slot, the blank strikes and trips an actuator 112 of a switch LS14B. This switch LS14B detects the presence of a blank on the suction cups and holds open a control circuit until the blank has dropped into the carton erection station slot 95 as explained more fully hereinafter.

The movable stop 90 is mounted on the outer end of a piston 115 which is in turn slidably mounted within an air cylinder 116. As explained heretofore, the piston 115 of the air cylinder 116 is controlled so that it moves quickly inwardly upon inward movement of the suction cup 92 and then slowly outwardly to its extended position after the leading blank in the magazine 34 has been moved out of the plane of the stop 90.

The feeder mechanism 36 of station 30 for removing the forwardmost carton lid blank 11 from the magazine 35 is identical to the feed mechanism for removing bottom blanks 10 from the magazine 34. It comprises a movable suction cup 120 fixedly mounted upon the outer end of a piston 121. This piston is spring-biased outwardly within a cylinder 122. The cylinder 122 is supported upon a depending bracket 123 which is in turn pivotally connected to a piston 124. Piston 124 is movable within a pneumatic cylinder 125. Rollers 127, 128 secured to the bracket 123 are movable within a cam track 129 of a cam plate 126. The sequence of movement of the suction cup 120 is identical to the movement of the suction cup 92 in that the cup after having a vacuum applied thereto, moves first horizontally inwardly and then horizontally inwardly and downwardly so as to pull the leadingmost carton lid blank 11 inwardly and downwardly and position it above a vertical slot 130. The carton lid blank then falls into the slot 130 upon release of the vacuum to the cup 120. Engagement of the carton blank with a feeler 131 opens a control circuit until the blank drops below the feeler as described more fully hereinafter.

The movable stop 91 is mounted on the outer end of a piston 135 which is in turn movable within a pneumatic cylinder 136. Movement of this piston and the attached stop is controlled so that the stop moves quickly away from and out of contact with the leadingmost carton lid blank as the vacuum cup 120 initiates its inward movement to pull the leadingmost blank inwardly. The blank is then free to be pulled downwardly by the suction cup 120 while it is out of contact with the stop 91. The timing of the movement of the stop is such that the stop engages the next following blank after the leading blank has been pulled downwardly from between the stop. The stop 91 is then pushed slowly outwardly to reposition the carton blanks for the next extraction cycle.

Carton Erection Stations

The carton bottom erection station 32 differs from the lid erection station 37 principally in the shape of the female forming dies used to shape the trays during erection. Considering first the barton bottom erection station 32, it will be seen that it consists of the slot 95 which is defined by a frame 146 and an abutment 147. The abutment 147 is pivotally suspended from a transverse bar 148 and has a counterweight 149 secured thereto. Thus, the abutment 147 normally maintains a vertical attitude, as best shown in FIG. 10, to hold a blank 11 vertically in the erection station 32. As the blank is being formed, the panel 15 is moved rearwardly into engagement with the bar 147 while the panel 12 is forced through the frame 146. The abutment bar 147 then accommodates this movement of the panel 15 by swinging rearwardly with the folding panel 15.

The frame 146 is defined by a pair of vertical bars 140, 141 and a pair of horizontal bars 142, 143. Thus oriented, these bars 140—143 of the frame 146 define a generally rectangular female mandrel through which a male mandrel 145 is movable. In moving through the female mandrel, the male mandrel 145 pushes a bottom blank 10 through the frame 146 and, as explained more fully hereinafter, causes the box to be configurated into a tray configuration as illustrated in FIGS. 1 and 2.

As may be seen most clearly in FIGS. 10 and 11, the horizontal frame rods 142, 143 are straight rods, but the central sections 137, 138 of the vertical rods 140, 141 are offset inwardly toward the slot 95. These offset sections 137, 138 insure that as the carton blank is forced through the frame defined by the rods 140—143, the side panels 13 and 14 are folded inwardly out of the plane of the carton blank before folding movement of the front and rear panels 15, 16 is initiated. Consequently, the flaps 17, 18, 19 and 20 are always folded outside rather than inside of the side panels 13 and 14.

The frame rods 140, 141, 142 and 143 are all welded or otherwise fixedly secured to a surrounding rectangular frame defined by a pair of vertical rods 151, 152 and a pair of horizontal rods 153, 154. The rods 151—154 are in turn welded to the tubular frame 43 of the machine.

To force carton blanks through the carton forming frame defined by the rods 140—143, the male mandrel 145 is mounted for reciprocation through the central aperture defined by the frame. This mandrel 145 is generally U-shaped as viewed in cross section and has a web section 157 mounted in a vertical plane. This web section 157 is secured to one end of a double ended piston 158, the opposite end of which carries a male mandrel 159 operable to form the carton lid blanks, as explained more fully hereinafter. The piston 158 is movable within a cylinder 156, which cylinder is fixedly mounted by a pair of brackets 160, 161 upon the top of a pair of legs 162, 163 of a mandrel supporting platform 164. The platform 164 is in turn mounted upon a generally truncated pyramid-shaped base 170, the bottom of which is fixedly secured to the tubular frame 143 of the machine.

The mandrels 145, 159 are both supported for reciprocal movement in a horizontal plane upon a pair of guide rods 174, 175. These rods are slidably supported within bearings mounted within the vertical legs 162, 163 of the platform 164.

Since both mandrels 145, 159 are mounted on opposite ends of the double ended piston 158, they operate alternately in that one is extended into a forming frame or is operable to upset a carton blank while the other is withdrawn or moved out of a previously formed carton. Consequently, carton lids and carton bottoms are formed alternately. The two are never formed simultaneously.

The flat cut and scored carton lid blanks 11 are located and are supported upon the platform 133 preparatory to being formed by movement of the mandrel 159 through a female forming frame 179. This frame 179 comprises a pair of side plows 180, 181, a series of five top vertical guide plates 182, a series of five lower vertical guide plates 183, a pair of upper flap guide plows 184, 185, and a pair of lower flap guide plows 186, 187. The two side plows 180, 181 are located in a vertical plane in the path of movement of the side panels 22, 23 of cartons pushed through the lid forming frame 179. The plates are angulated, as may be seen most clearly in FIG. 11, so that in moving through the plates the plows force the side panels inwardly. Both plows 180, 181 are fixedly mounted upon the tubular frame and are supported thereon by horizontal brackets 176, 177 which are secured at one end to the plows and at the opposite end to the frame.

The five upper plates 182 are pivotally secured to and depend from a transverse support rod 190. Pivotal movement of plates 182 is limited to a very short arc by a transverse rod 191 which extends through slots in the lower ends of the plates. Both rods 190, 191 are fixedly secured to the frame by end brackets 192, 193 which are welded to the frame.

The upper ends of the plates 182 are all angulated so as to define a curved surface 195, over which the blanks are guided into the vertical slot 130. The lower ends are similarly curved and define an arcuate surface 196 which leads into a downwardly and outwardly tapered cam surface 197. These surfaces 196, 197 act as plows to force the uppermost flaps 24 of the blanks inwardly as the blanks are forced beneath the plates 182.

The lower set of five plates 183 are identical in shape to the upper plates 182 and are mounted in exactly the same fashion, i.e., they are pivotally supported upon a transverse support shaft 200 and are limited in the extent to which they may move about the shaft by a transverse rod 201 which extends through slots 203 in the plates. Both the transverse rod 201 and the transverse shaft 200 are fixedly mounted upon support brackets 205 which are welded or fixedly secured to the frame of the machine.

By mounting the plates 182, 183 so that they are free to move angularly to some limited extent, the frame 179 is able to accommodate slightly oversize or undersize lid blanks as well as blanks which are imperfectly positioned relative to the frame 179.

To plow the upper flaps 27 and 28 down inside the top of the side panels 22, 23, as illustrated most clearly in FIG. 1, a pair of upper flap plows 184 and 185 extend transversely outwardly from the outermost support brackets 182. These plows are located in the path of movement of the flaps and are angulated so that they cause the flaps to be moved inwardly just prior to the side panels of the blank.

The lower plows 186, 187 which cause the flaps 26, 29 to be folded inwardly prior to engagement of the lower panel 25 with the plows 183, similarly extend angularly outwardly from and are secured to the two outermost plows 183.

As the flat carton blank is pushed between the side plows 180, 181, the upper plows or plates 182 and the lower plows or plates 183, the carton side panels, front and rear panels are folded around the mandrel 159 and the flaps 26, 27, 28, 29 are folded down and beneath the side panels 22 and 23. The result is a tray within which is located the forming mandrel 159.

CARTON STAPLING STATIONS

While the carton bottoms are still supported upon the mandrel 145 and the carton lids are supported upon the mandrel 159, they are indexed past the stapling stations 33 and 38 respectively. This indexing consists of moving the carton bottoms in three indexing movements or steps through the carton stapling station 33. After each indexing movement, four staples are placed into the carton by four stapling machines at each station. In the case of the carton bottom stapling station 33, these staplers have been identified by the numerals 208, 209, 210 and 211. At the carton lid stapling station, the staplers are identified by the numerals 212, 213, 214 and 215.

The stapling machines per se 208—214 are commercially available staplers which, because they are off-the-shelf items of hardware, have not been described in detail herein. One such stapler which has been found to be satisfactory for this purpose is manufactured by the Bostitch Company and is identified as their model No. FC95 stapling head. Of course, any conventional stapler could be utilized for this application.

The four staplers 208—211 at the carton bottom stapling station are mounted in exactly the same fashion as the four staplers 212—215 at the carton lid stapling station. Therefore, only the mounting of the four staplers 212—215 are shown and described in detail although it should be appreciated that, except for the spacing, the mounting of the four staplers 209—211 is identical.

Each of the four staplers 212, 213, 214 and 215 is pivotally supported at its outer end between a pair of plates 220, 221 which are welded to the frame 43. These plates support set screws 223, the ends 224 of which extend into recesses in the sides of the staplers so that the screws pivotally support the staplers for movement about the axis of the screws 223.

Oscillatory movement of the opposite ends of the staplers is controlled by oscillatory movement of a vertical pin 225. This pin extends through and is secured within a vertical aperture in the stapler so that movement of the pin effects a corresponding movement of the end 226 of the staplers 212—215.

The pin 225 is supported at its opposite ends within a recess or slot 219 of a pair of support arms 227, 228. Set screws 229 extend through the slots 219 of each of the arms 227, 228 and hold the pins 225 within the slots 219. Both of the arms 227, 228 are adjustably mounted upon a support sleeve 230 which is in turn keyed to a vertical support shaft 231 by a lock pin 232. The sleeve 230 has a pair of lateral flanges 235, 236 which extend outwardly from opposite sides thereof. The arms 227, 228 are supported and adjustably secured thereto by means of lock screws 238 which extend through arcuate slots 239 of the arms and into threaded recesses in the flanges 235, 236. To facilitate the angular adjustment of the arms 227, 228 relative to the sleeve 230, each upper arm 228 has a pair of depending bosses 240 and each lower arm 227 has a corresponding pair of upstanding bosses 242. Setscrews 245 extend through these bosses 240, 242 and into engagement with the flange 235 of the sleeve. When the lock screws 238 are loosened, two of the setscrews 245 on one side of the flange 235 may be tightened while two others on the other side of the flange are loosened to vary the angular position of the arms 227, 228 relative to the sleeve. After adjustment, the lock screws 238 are tightened to lock the arms in the desired angularly adjusted position.

To oscillate the shafts 231 and thus the stapler supporting arms 227, 228 keyed thereto, each shaft has a control arm 250, 251 keyed to its upper end. A tie bar 253 interconnects the ends of the arms 250, 251. This tie bar includes a hydraulic motor 254. The piston of this hydraulic motor 254 is connected to the tie rod 253 and the cylinder is connected to the arm 250 so that movement of the piston into the cylinder causes the arms 250, 251 to be moved toward each other, thereby pushing the ends 226 of the staplers 212—215 inwardly. Movement of the piston outwardly relative to the cylinder causes the arms 250, 251 to be moved apart, thereby moving the ends 226 of the staplers outwardly away from the cartons.

This mounting of the four staplers 212, 213, 214, and 215 enables the staplers to be self-centering relative to the cartons. That is, if the staplers to one side of the carton, as for example the staplers 212, 213, move into contact with the carton and cause their staples to be fully inserted before the staples in the guns 214, 215 are fully inserted, the staple guns 212, 213 will terminate their movement relative to the mandrel while the two other guns 214, 215 will continue to move inwardly so that all four staples are fully inserted into the carton. The adjustable mounting of the staple guns 212, 213, 214 and 215 enables the two guns on one side of the carton, as for example 212, 213, to be adjusted so that the staples on that side are always inserted to the same extent. This mounting arrangement insures that all four staples are all fully engaged and properly closed so as to lock the erected carton in an erected condition. This is particularly critical in the case of wax covered corrugated containers such as those illustrated in FIG. 2 which are often used to ship fish or poultry packed in ice. These cartons must be exceptionally strong and subject to extreme abuse, as for example, being dropped fully loaded from a five-foot height.

As the carton lids are indexed through the stapling station 38, four staples 259 are simultaneously inserted into the approximate center of the carton by the four stapling guns 212—215. At the bottom stapling station 33 the cartons are indexed through three positions of the station. At the first stop position, four staples 260 are simultaneously inserted into the carton by the four stapling guns 208—211. Subsequently, the carton is indexed approximately 1 inch and four more staples 261 are simultaneously inserted into the carton bottom. Thereafter, the carton is indexed one more time and four more staples 262 are inserted into the bottom. In each instance, the forming mandrels 145 and 159 act as anvils against which the ends of the staples engage and are cammed inwardly into a locked position.

After being formed and stapled, the mandrels are alternately extracted or pulled rearwardly out of the carton lids and bottoms. As the mandrels move rearwardly, pivotally mounted pawls 265 engage the open end of the carton sidewalls so as to prevent the carton lid from moving with the mandrel. Thereby, the lid is stripped from the mandrel. These pawls 265 have been illustrated only in the lid stapling station, but it should be understood that identical pawls at the bottom stapling station strip the bottoms from the mandrel 145.

As may be seen most clearly in FIGS. 10 and 11, the pawls 265 are pivotally mounted upon pins 266. The pins are in turn supported by brackets attached to a rectangular frame 268. The frame 268 is welded or otherwise secured to the tubular frame 43 of the machine.

Operation Of Electrical Control System

The complete operating cycle of this machine can best be described in connection with a detailed statement of operation of the electrical control circuit illustrated in FIGS. 12A—12C. This is an electrical ladder diagram in which the horizontal rungs have been given a numerical line designation in the 500 series for ease of reference to switches, relays, contacts, etc.

Referring to these figures, it will be seen that the circuit includes three main drive motors M1, M2, and M3. The motor M1 is a hydraulic pump motor operable to drive the pump which supplies fluid to the stapling machine linkage motors 254 and the mandrel drive motor 156. The motor M2 is a carton bottom blank feed screw drive and the motor M3 is a lid blank feed screw motor. These three motors are controlled by the main power switch contacts L1, L2 and L3 together with a series of contacts MS1-2, MS2-2, MS3-2 of the relays MS1 (line 505), MS2 (line 503), and MS3 (line 501), respectively. The switches L1, L2, and L3 are all closed when the power is turned on to the machine through the main control switch box (not shown) and the contacts of the relays MS1 (line 505), MS2 (line 503), and MS3 (line 501) are controlled by the machine control circuit, as is explained more fully hereinafter.

Power to the main control circuit is supplied through the switch contacts L1, L2 and L3 to a primary winding of a 220 volt two-phase transformer 303. The secondary winding of this transformer supplies 110 volt, single-phase power to a pair of leads 300, 301 of the control circuit.

Upon the closing of the switches L1, L2 and L3, the main control circuit is conditioned for initiation of carton lid and carton bottom erection cycles, which cycles are repeated indefinitely so long as carton lid and carton bottom blanks are supplied to the machine.

To start the machine cycle, a start lid feed pushbutton PB11 (line 501) is actuated to close a switch and thereby complete a circuit to the relay MS3 via line 501 through a stop lid feed emergency pushbutton PB14. The start pushbutton PB11 is only momentarily closed and is reopened, but the circuit to the relay MS3 is maintained through a hold contact MS3-1 (line 502). So long as the relay MS3 is energized, an indicator bulb 306 (line 502) in parallel with the relay MS3 is energized indicating that the motor M3 is operating as a consequence of the normally open relay contacts MS3-2 having been closed.

The start carbon bottom feed pushbutton PB13 is then actuated, closing a switch to complete a circuit through a stop bottom feed emergency pushbutton PB12 to the relay MS2 via line 503. Energization of this relay pulls in a holding contact MS2-1 (line 504) so that the relay MS2 remains energized after the pushbutton PB13 is released and opened. A signal light 310 (line 504) in parallel with the relay MS2 indicates the energization of the motor M2 as a consequence of the normally open contacts MS2-2 having been closed by the relay MS2.

In a like fashion, the relay MS1 is energized upon closing of a pump start switch PB9 (line 505). Closing of this switch PB9 completes a circuit in line 505 through a stop pump emergency pushbutton PB10 to the relay MS1. When the relay MS1 is energized, it pulls in the holding contact MS1-1 (line 506) so as to maintain the relay energized together with an indicator light 313 (line 506) connected in parallel with the relay. This indicator light indicates that the normally open contacts MS1-2 are closed and that the hydraulic pump motor M1 is operating.

Having turned on the three main control motors M1, M2, and M3, the next step for the machine operator is to select either a run or jog cycle on a selector switch 315. For the moment, it will be assumed that a run cycle is initiated. The jog circuit is primarily utilized to set up the machine initially after which the selector switch is placed on run cycle.

With the selector switch 315 in the run cycle position, power is supplied from the lead 300 through the switch 315 to line 510. With power in this line 510, the control circuit is conditioned for initiation of a run cycle which is then initiated by the closing of a cycle start switch PB1 (line 511). Closing of this switch completes a circuit in line 511 to an automatic run control relay CR13 from the lead 300, via normally closed contact CR12-1, and emergency stop switch PB2. Upon energization of the relay CR13, a holding contact CR13-1 (line 512) is closed, thereby maintaining the relay CR13 energized after the cycle start button PB1 is released by the machine operator. A signal light 320 (line 512) connected in parallel with the relay CR13 is simultaneously energized indicating that the machine is on an automatic run cycle.

Energization of the automatic run control relay CR13 also closes a contact CR13-2 (line 510), thereby supplying power to a main lead 321.

Energization of the relay CR13 also causes the normally open contact CR13-3 (line 570) to be closed, thereby supplying power to the feed screw clutch control circuit. Closing of this contact results in the four electric clutches 60, 61, 81 and 82 being energized or pulled in as a result of energization of their electric clutch control solenoids SV6B, SV7B, SV8L and SV9L, in lines 571-574 respectively. These clutch control solenoids SV6B, SV7B, SV8L and SV9L remain energized so long as the limit switches or feeler switches LS15B, LS16B, LS17L, and LS18L (FIGS. 7, 8 and lines 571-574) remain closed. These switches will remain closed unless or until engaged by the forwardmost carton blank on the feed screw conveyor as explained heretofore.

Energization of the relay CR13 also effects closing of the contacts CR13-4 (line 575) and CR13-5 (line 577). Closing of these contacts supplies power to the lines 575 and 577. These lines are connected in series with the electrical solenoids SV10B and SV10L which control the air cylinders 116 and 136, respectively. Normally, when these solenoids are deenergized, air pressure is supplied to the motors 116 and 136 so as to force the movable abutments 90, 91 respectively, outwardly. Upon movement of the suction cups 92 and 120 inwardly to extract a carton from the carton bottom blank or carton lid blank magazine, the switches LS19B and LS19L respectively are tripped or closed, thereby energizing the solenoids SV10B and SV10L so as to cause the motors 116 and 136 to move the abutments 90, 91 quickly inwardly out of contact with the forwardmost carton bottom blank or carton lid blank in the magazine as explained more fully hereinafter in connection with the description of the vacuum cup control circuit, the cup then extracts the forwardmost carton blank and drops it into slot 95.

When a carton bottom blank drops into the slot 95, it conditions the control circuit for the next step in the cycling of the machine; i.e., extension of the mandrel 145 on the box side of the machine so as to force the flat blank through the forming frame 146. Upon dropping of a blank into the slot 95, the normally open switch LS8B is closed and the normally closed switch LS9B is opened (FIG. 10, line 514 and line 554). Closing of the switch LS8B results in the energization of a memory relay CR6 through a circuit from the lead 321, via line 514 which includes, the normally closed contact CR4-2 of relay CR4 and contact LS8B-1 of switch LS8B. Energization of the relay CR6 effects closing of a holding contact CR6-1 (line 515). The contact CR6-1 is connected in series with the normally closed contact CR7-2 of another memory relay CR7 (line 517). Thus the relay CR6 remains energized either through the contact LS8B-1 of switch LS8B or through the holding contact CR6-1 so long as a carton remains in contact with the switch LS8B or until the relay CR7 is energized.

Energization of the memory relay CR6 also effects closing of the normally open contact CR6-2 (line 512) thereby supplying power to lead 339. With power supplied to lead 339 and with the switch LS8B closed, indicating the presence of a bottom blank at the erection station, the circuit is completed to a mandrel program relay CR1 (line 530) from lead 339 through the normally closed contact CR4-1, contacts LS8B-2 of switch LS8B, and normally closed contact CR7-4. Energization of the relay CR1 pulls in the holding contact CR1-1 (line 531) so as to maintain the relay CR1 energized after the carton blank is moved out of contact with the switch LS8B and the contact LS8B-2 of switch LS8B opens.

Energization of the relay CR1 also effects closing of the normally open contact CR1-3 (line 537). Closing of this contact completes a circuit to a mandrel movement control solenoid SV1B. Upon energization of this solenoid SV1B, fluid pressure is supplied to the hydraulic motor 156 through a solenoid controlled valve (not shown) so that the piston of the motor is moved toward the box bottom forming end of the machine. This results in the mandrel 145 being pushed through the forming frame 146 so that the carton bottom blank is formed into a tray configuration and is wrapped around the mandrel 145. The piston continues to move outwardly together with the attached mandrel until the normally closed contact LS4B-2 (line 531) of switch LS4B (FIG. 10) is opened. The switch LS4B is tripped by a switch control rod 155 attached to the mandrel 159. When the switch contact LS4B-2 is opened, the relay CR1 is deenergized, thereby opening the contact CR1-3 (line 537) and deenergizing the mandrel movement control solenoid SV1B.

Deenergization of the relay CR1 closes the normally closed contact CR1-5 (line 541) thereby completing a circuit to the stapler down control relay CR10 via a control circuit from the lead 321 through the contact CR1-5, via the normally open contact CR3-3 and the normally closed contact CR8-2. The normally open contact CR3-3 is a contact of the mandrel memory control relay CR3 (line 519). This relay is energized whenever the mandrel moves and is deenergized whenever the staplers are all the way down or in. Energization of the relay CR3 is effected by closing of the contact CR1-2, thereby completing a circuit to the relay CR3 through line 519. A holding contact CR3-1 (line 520) of the relay CR3 then pulls in and maintains the relay CR3 energized until the contact LS1B-1 of switch LS1B (FIG. 5) is opened. This contact of the switch LS1B is opened when the staplers are moved all the way down or into a box and the contact LS1B-1 is closed by contact of the switch LS1B with the switch control rod 258 secured to and movable with the piston rod 253 of the stapler control motor 254. Actuation of the staplers down control relay CR10 (line 541) results in closing of the contact CR10-1 (line 542), thereby completing a circuit to the staplers down control solenoid SV2B. This solenoid then positions a valve (not shown) so that hydraulic fluid actuates the motor 254 to move the staplers inwardly.

Actuation of the switch LS1B, indicating that the staplers are all the way down or into the box effects deenergization of the stapler memory relay CR3 (line 519) and energization of the staple retract control relay CR8 (line 544). Energization of this later relay is effected by completion of a circuit from the lead 339 via contact LS1B-2 of switch LS1B and normally closed contact CR10-3. Upon energization of the relay CR8, a holding contact CR8-1 (line 546) is closed, thereby completing a holding circuit from lead 339 to the relay CR8 via contact LS2B-1 of switch LS2B (which is closed whenever the staplers are in any position other than a fully retracted one as may be seen most clearly in FIG. 5).

Upon energization of the relay CR8, the contact CR8-3 (line 548) is closed, thereby completing a circuit from lead 339 to the stapler retract control solenoid SV3B. Energization of this solenoid causes fluid pressure to be supplied to that side of the hydraulic motor 254 which effects outward movement of the staplers away from the mandrel or carton. The staplers continue to move outwardly until they reach the fully retracted position, in which position the switch LS2B is actuated and the contact LS2B-1 (line 546) is opened. This results in deenergization of the stapler retract control solenoid CR8.

When the mandrel reached its first index position, the switch LS4B was actuated, thereby opening the normally closed contact LS4B-2 (line 531). This opened the holding circuit to the mandrel control relay CR1. This relay CR1 then remained deenergized throughout the stapling cycle heretofore described.

When the carton bottom staplers reach the fully retracted position, the mandrel control relay CR1 (line 530) is again energized through the normally closed contact LS2B-2 of the switch LS2B (FIG. 5). The circuit which effects the energization of this relay CR1 from lead 339, consists of line 528, normally open contact TD2-1 of time delay relay TD2 (line 532), switch contact LS2B-2 and normally closed contact CR7-4.

The time delay contact TD2-1 was closed a predetermined time delay after the switch LS4B (FIG. 10) was actuated, thereby closing the normally open contact LS4B-3 (line 532). Closing of that contact energized the relay TD2 through contact LS4B-3 and normally closed contact LS3B-1.

As explained heretofore, energization of the relay CR1 effects forward movement of the mandrel 145 to the second index position at which the switch LS3B (FIG. 10) is actuated. Actuation of this switch opens the normally closed contact LS3B-1 of the switch to deenergize the time delay relay TD2. Deenergization of this relay drops out the relay CR1 upon opening of the contact TD2-1.

As explained heretofore, deenergization of the relay CR1 closes the normally closed contact CR1-5 (line 541) of this relay, thereby energizing the staple down relay CR10. The staplers then go through the sequence heretofore described and when fully retracted, the switch LS2B is actuated and the normally closed contact LS2B-2 (line 529) of the switch LS2B is closed. When this switch contact LS2B-2 is again closed, the mandrel control relay CR1 is again energized through the time delay contact TD3-1 of time delay relay TD3 (line 533). This time delay relay was energized when the mandrel reached its second index position, thereby closing the contact LS3B-2 of the second position switch LS3B. Closing of this contact energizes the relay TD3 from lead 339, via switch contact LS3B-2 and normally closed contact LS7B-1 of switch LS7B.

The mandrel then continues to move forwardly to the third index position until the normally closed contact LS7B-1 (line 533) is opened by engagement of the actuator 155 with the switch LS7B (FIG. 10). This results in the contact LS7B-1 being opened to deenergize the time delay relay TD3. Deenergization of the relay TD3 opens the normally open contact TD3-1 (line 529) and thereby deenergizes the mandrel control relay CR1. Deenergization of the relay CR1 causes the staplers to go through the stapling sequence heretofore described.

When the box bottom forming mandrel 145 reaches its third index position, as illustrated in FIG. 10, the lid forming mandrel 159 is out of vertical alignment with the slot 130 so that a lid blank may fall through the slot into engagement with the actuator or feeler of the switches LS8L and LS9L. As explained hereinafter, the vacuum cycle is programmed so that the lid blank drops down into the slot 130 and engages the switches LS8L and LS9L, thereby closing the normally open contact LS8L-1 (line 517) and opening the normally closed contact LS9L-1 (line 555).

Closing of the contact LS8L-1 completes a circuit in line 517 to the memory relay CR7 from lead 321 via normally closed contact CR4-2 (line 514) of relay CR4, lead 380 and contact LS8L-1. Energization of the relay CR7 results in opening of the contact CR6-2 (line 512) and closing of the normally open contact CR7-1 (line 510) in lead 381. Thus a lead 381 is energized and the lead 339 deenergized.

The contact CR6-2 (line 512) is opened as a consequence of deenergization of the relay CR6 when the relay CR7 is energized. This relay CR6 is deenergized because the contact CR7-2 (line 515) is opened, thereby opening the holding circuit to the relay CR6. Simultaneously, a holding circuit is completed on line 518 to the relay CR7 from lead 321 via normally open contact CR7-3 and normally closed contact CR6-3.

Presence of a lid blank 11 in front of the mandrel 159 in the slot 130 effects closing of the normally open contact LS8L-2 (line 534) of the switch LS8L (FIG. 10). Closing of this contact results in energization of the relay CR1C. A holding contact CR1C-1 (line 535) of the relay CR1C is then energized and maintains the relay CR1C energized after the contact LS8L-2 is open. Energization of the relay CR1C also effects closing of the contact CR1C-2 (line 536), thereby completing a circuit to the mandrel control relay CR1 (line 530) from lead 339 via lines 536 and 384.

Energization of the relay CR1 effects energization of the lid mandrel control solenoid SV1L as a result of the closing of the contact CR1-4 (line 539). Closing of this contact completes a circuit from the line 381. The mandrel then moves toward the lid forming end of the machine until the switch LS4L (FIG. 10) is opened by disengagement of the switch actuator 155 with the contact of the switch. This results in the contact LS4L-1 (line 535) of switch LS4L being opened, thereby deenergizing the relay CR1C and opening its contact CR1C-2 (line 536) to deenergize the relay CR1. Deenergization of this relay CR1 causes the contact CR1-4 (line 539) to be opened, the solenoid SV1L to be deenergized, and the mandrel movement to be terminated preparatory to a stapling operation.

Deenergization of the relay CR1 closes the contact CR1-5 (line 541), thereby energizing the staple down relay CR10, as explained heretofore. Energization of the relay CR10 effects closing of the normally open contact CR10-2 (line 543), thereby energizing the staple down control solenoid SV2L. Energization of this solenoid causes hydraulic fluid to be supplied to the motor 254 so as to cause the staplers to be moved down or inwardly toward each other, thereby stapling the lid in an assembled condition. When the staples are fully inserted, the switch LS2L (FIG. 5, line 545) is closed, thereby energizing the staple control relay CR8 (line 544). Energization of the relay CR8 causes the holding relay contact CR8-1 (line 546) to close, thereby completing a holding circuit to the relay CR8 via contact LS2L-2 of switch LS2L. Energization of the relay CR8 also effects closing of the contact CR8-4 (line 549) to complete a circuit to the stapler retract control solenoid SV3L. Energization of this solenoid causes the hydraulic motor 254 to move the staplers outwardly until the switch actuator rod 258 engages the stapler pullout switch LS2L and opens the holding circuit to the relay CR8. This results in deenergization of the stapler control relay CR8 with the staplers fully retracted.

The mandrel control circuit is now conditioned for movement of the mandrel in the opposite direction as previously described toward the bottom forming end of the machine upon arrival of a carton bottom blank into the slot 95 and actuation of the control switches LS8B and LS9B.

A cycle of the carton feeder mechanism is initiated by energization of a cup extend and hold relay CR9 (line 557). Energization of this relay though is controlled by a time delay relay TD4 (line 554) which is only energized after a predetermined set of conditions are fulfilled. Specifically, in the case of the energization of the relay TD4 for a carton bottom feeding cycle, the relay CR6 must be energized to close the contact CR6-5 indicating that a bottom blank 10 is located in front of the mandrel 145 preparatory to a forming operation. The contact CR5-1 of relay CR5 must be closed by deenergization of the relay CR5 indicating that the lid feed cycle is not in operation. This relay CR5 (line 508) is controlled by closing of the switch LS13L (FIG. 9). Whenever the lid engaging cup 120 is extended toward the lid storage magazine, this switch LS13L is closed and the relay CR5 is energized.

The switch LS14B must also be closed. This is a normally closed switch located in the path of movement of a blank carried by the suction cup 92, the blank being effective to hold the switch open. The fact that this switch is closed indicates that the cup is out of engagement with a carton bottom blank.

Contacts LS15B-1 and LS16B-1 of switches LS15B and LS16B (FIG. 7) must also be closed. These are normally open contacts of the switches which are located adjacent the forward end of the feed screws 45 and 46. When these switch contacts are closed, it indicates that a carton is in the forwardmost position on the conveyor preparatory to a feed cycle.

Switch LS9B (FIG. 10) must also be closed to energize the time delay relay TD4. This is a normally closed switch which is opened upon a carton dropping into the slot 95 and engaging the feeler of the switch.

When all of these conditions have been met, the relay TD4 is energized. This results in the contact TD4-1 (line 556) being closed after a preset time delay, thereby completing a circuit from lead 321 to the relay CR9. Energization of this relay CR9 pulls in holding contact CR9-1 (line 557) to complete a holding circuit around the time delay contact TD4-1 so that the relay remains energized until another time delay relay contact TD1-1 is opened, as explained more fully hereinafter.

Upon energization of the relay CR9, the contact CR9-2 (line 559) is closed, thereby completing a circuit from lead 381 to the cup forward control solenoid SV4B (line 559). Upon energization of this solenoid, the suction cup 92 is moved forwardly by the pneumatic motor 102 to its fully extended position.

When the cup 92 reaches its forwardmost position and is engaged with the forwardmost carton on the conveyor, the switch LS12B (FIG. 9 and line 550) is closed, thereby completing a circuit via lead 385 to time delay relay TD1 (line 553). Energization of this relay TD1 opens the normally closed contact TD1-1 (line 557), thereby deenergizing the relay CR9. Upon deenergization of the relay CR9, the cup forward control solenoid SV4B (line 559) is deenergized. Deenergization of this solenoid enables a spring return of the control valve (not shown) to move to the position in which air pressure to the pneumatic motor 102 effects retraction of the cup 92 to the fully retracted position. If the cup is carrying a blank, in moving back the blank engages the actuator 112 of switch LS14B, thereby opening the contact LS14B in the circuit to the control relay TD4 and deenergizing it.

When the cup 92 starts to move forwardly, a vacuum is connected to the cup by energization of a vacuum control relay CR11 (line 564). This relay is energized via a normally open contact CR9-4 (line 562), and lead 386. Upon energization of the relay CR11 a holding contact CR11-1 (line 564) is closed, thereby completing a holding circuit from lead 339 via line 463 which includes the normally closed contact LS7B-2 of switch LS7B, and normally open contact CR6-6. Energization of this relay CR11 also effects closing of the normally open contact CR11-2 (line 566), thereby energizing the vacuum control solenoid SV5B. This results in the vacuum being applied to the vacuum cup before it reaches the forward extent of its movement and engages the forwardmost blank on the conveyor. Thereafter, the vacuum is maintained to the cup until the normally closed contact of LS7B-2 of switch LS7B is opened and opens the holding circuit in line 563 to the relay CR11. This switch LS7B (FIG. 10) is opened when the bottom forming mandrel 145 reaches the rearward extent of its movement so that the slot 95 is free and open preparatory to receiving the next carton in the slot.

Movement of the lid pickup vacuum cup 120 is also controlled by the time delay relay TD4 and the cup movement relay CR9. These two relays operate alternately to control first the movement of the cup 92 in a forward direction and then the movement of the cup 120 in a forward direction. The circuit for controlling movement of the lid feed cup 120 comprises the line 555 which includes the contact CR7-6 of the relay CR7, the contact CR2-2 of the relay CR2, and the switches LS14L, LS17L, LS9L, and LS18L. These latter four switches are identical in function and location to the corresponding switches in line 554 except that they control the lid pickup cup 120 rather than the bottom pickup cup 92.

In the same way as has been heretofore explained, energization of the time delay relay TD4 effects energization of the cup movement control relay CR9. Energization of this latter relay closes the contact Cr9-3 (line 561) and completes a circuit from lead 339 to the cup forward control solenoid SV4L. Energization of this solenoid results in the pneumatic motor 125 moving the cup 120 to its forwardly extended position. When fully extended and engaged with a lid blank 11, the switch LS12L (line 551 and FIG. 9) is closed, thereby completing a circuit to the time delay relay TD1 via lead 385. Energization of this relay opens the contact ID1-1 (line 457) and deenergizes the vacuum cup movement control solenoid CR9. Deenergization of this relay CR9 opens the contact CR9-3 (line 561) and deenergizes the solenoid SV4L. This results in the solenoid control valve moving to a position in which air is supplied to the opposite end of the motor 125 and the cup 120 is thereby retracted from the carton lid blank.

When the relay CR9 is energized to initiate forward movement of the vacuum cup 120 toward the forwardmost carton in the magazine, its contact CR9-4 (line 562) closes, thereby energizing the vacuum control relay CR11. This relay is then held in by the closing of contact CR11-1 through the line 564 which includes normally closed contacts LS4L-2 of switch LS4L, and normally open contact CR7-7. Energization of the relay CR11 closes the contact CR11-3 (line 568) to complete a circuit to a vacuum control solenoid SV5L. Energization of this solenoid results in connection of the cup 120 to a vacuum which remains on and connected to the cup until the mandrel 159 on the lid end of the machine is fully retracted. Full retraction of this mandrel 159 results in opening of the contact LS4L-2 of switch LS4L to drop out the vacuum control relay CR11. Deenergization of this relay then opens the contact CR11-3 (line 568) and deenergizes the vacuum control solenoid SV5L. This results in the solenoid controlled valve (not shown) moving to a position which connects the cup 120 to atmospheric pressure so that the lid blank carried by it drops into the slot 130 preparatory to the next lid forming cycle.

The cycle selection switch 315 may be moved to the jog position indicated by dotted lines in FIG. 12A (line 510). In this position of the switch, the solenoid CR12 is energized. This is the main jog control relay which conditions the machine control system to enable parallel jog control relay circuits to be closed by pushbuttons. This in turn enables each of the movable sections of the machine to be controlled manually for purposes of setup or a test run without corresponding movement of other portions of the machine. The jog control pushbuttons and control circuits have been identified by legends over each pushbutton. Accordingly, in the interest of brevity and clarity, the individual jog control circuits have not been described in detail herein.

Machine Operation

Briefly, the machine heretofore described in detail, cycles so as to set up carton bottom blanks 10 and carton lid blanks 11 alternately. This is accomplished by engagement of the vacuum cup 92 with a blank 10 and, while a vacuum is connected to the cup, movement of the cup rearwardly to pull the forwardmost blank on the lead screws 45, 46 off of the screws. Simultaneously with the retraction of the suction cup 92, the movable abutment 90 is moved rearwardly or inwardly at a fast rate so as to disengage the abutment 90 with the forwardmost carton blank. While the abutment 90 is out of engagement with the blank 10, the cup 92 causes the blank to be moved inwardly and downwardly beneath the plane of the abutment 90 and into the top of the slot 95 (FIG. 10). The vacuum to the cup is then released and the blank is allowed to fall downwardly into the slot until it engages and rests upon the top of the frame bar 96. At this time, the mandrel 145 is in its fully retracted position so that slot 95 is open and free to receive a carton bottom blank.

Arrival of a carton blank onto the rest 96 is detected by the control switches LS8B and LS9B. These switches control initiation of movement of the mandrel 145 forwardly, causing the blank to be forced through the female forming frame 146 so that the blank is formed into a tray as illustrated in FIG. 2. Staplers (FIG. 5) are then caused to move inwardly to insert staples into the carton. At this time, the mandrel 145 acts as an anvil against which the staples are caused to cam inwardly, into a locked condition. The staplers are then retracted and the mandrel 145 indexed to a second stapling location. At this second location, the staplers are again moved inwardly to insert a second set of staples into the sides of the carton bottom tray. The staplers are then withdrawn and the mandrel 145 indexed to its third position. The staplers are then moved inwardly and the third set of staples inserted into the carton bottom tray.

With the mandrel 145 in its forwardmost position, the lid forming mandrel 159 is in vertical alignment with the slot 130 so that the slot is ready to receive a lid blank. The vacuum cup 120 is then moved forwardly to engage the forwardmost lid blank 11 and a vacuum is applied to the cup. The cup then moves inwardly to pull a lid blank 9 off of the screws 75 and 76 of the magazine 35. Simultaneously with the inward movement of the cup 120 the movable abutment 91 is moved inwardly at a faster rate than the blanks so that they fall inwardly to permit the cup to move the forwardmost blank inwardly and downwardly out of the plane of the abutment 91. The cup then inserts the bottom of the forwardmost carton into the slot 130 at which time the vacuum to the cup is released and the lid blank is allowed to drop onto the abutment 133. The presence of the carton lid blank on the abutment 133 is detected by the limit switches LS8L and LS9L. These switches then initiate movement of the mandrel 159 forwardly to force the carton lid through the forming frame 179. The mandrel then pushes the lid blank through the forming frame and in so doing, forms the blank into a tray as indicated in FIG. 1. With the tray wrapped around the mandrel, the mandrel moves to a stapling station at which four staples are inserted into the lid by movement of the four staplers inwardly. The mandrel 159 then acts as an anvil for the staples and causes the ends of the staples to be cammed inwardly to a locked condition. The staplers then move outwardly and the machine is conditioned for the next operating cycle.

Carton blanks feed forwardly over the two lead screws 45 and 46 of the magazine 34 and the screws 75, 76 of the magazine 35 until the forwardmost carton in the magazine engages and closes the lead screws control switches LS15B, LS16B, LS17L and LS18L, respectively. Each of these switches controls the rotation of one of the lead screws so that the two lead screws of a single magazine operate independently. Consequently, the feed screws serve not only to feed the cartons forwardly on the conveyor but to square up the forwardmost carton on the conveyor relative to the ends of the screws. Additionally, as illustrated in FIG. 4, the pitch of the thread on the screws serves to space the cartons on the conveyor so that there is no vacuum created between adjacent blanks when the forwardmost blank is pulled off of the conveyor 34 or 35 by the suction cups 31 and 36.

While we have described only a single preferred embodiment of our invention, those persons skilled in the arts to which this invention pertains will readily appreciate numerous changes and modifications which may be made without departing from the spirit of our invention. For example, pneumatic clutches could be substituted for the electrical clutches 60, 61. As still another alternative, a pair of individually driven hydraulic drive motors could be used to rotate the screws in which event, the electrical switches at the ends of the screws would control a valve which would in turn control flow of fluid to the hydraulic motors. Therefore we intend to be limited only by the scope of the appended claims.

Having described our invention, we claim:

1. A carton erection machine comprising:
a pair of end-to-end aligned magazine feed conveyors, each of said conveyors being operable to supply flat cut and scored carton blanks in a horizontal direction from opposite sides to a pair of opposed carton feed stations,
means at each of said stations to feed cartons vertically from said magazine feed conveyors into a pair of opposed carton erection stations,
a pair of mandrels,
a pair of carton erection frames, each of said mandrels being cooperable with one of said carton erection frames at each of said erection stations to erect a flat carton blank into a tray as said mandrel is moved relative to said frame, and
means for reciprocating said mandrels in a horizontal direction parallel to the path of said aligned conveyors so as to move said mandrels through said frames and thereby sequentially erect blanks and feed them out of said machine in a path of movement parallel to said feed conveyors as a mandrel moves in one direction and at the other erection station as the other mandrel moves in the opposite direction.

2. The carton erection machine of claim 1 wherein at least one of said carton erection frames comprises four rods which define a generally rectangular frame located in a vertical plane, one of said mandrels being movable through said frame so as to force a carton blank therethrough and thereby cause it to be erected into a tray configuration.

3. The carton erection machine of claim 1 wherein at least one of said carton erection frames comprises a plurality of spaced flat plates having closure cam surfaces thereon, each of said plates being pivotally mounted for limited movement in the direction of movement of carton blanks through said frame, and means for limiting movement of said flat plates.

4. The carton erection machine of claim 1 wherein at least one of said carton erection frames comprises a series of transversely spaced forming elements having carton blank engageable cam surfaces on the lower side thereof, and a second set of transversely spaced forming elements located beneath the vertical plane of said first set, said second set of forming elements having carton blank engageable cam surfaces on the upper side thereof, both of said sets of forming elements being mounted for limited pivotal movement and having means engageable therewith to limit movement of said forming elements in a direction parallel to the direction of movement of blanks through said frame.

5. The carton erection machine of claim 4 wherein said one frame includes a pair of side panel engageable plows angulated inwardly relative to the direction of movement of carton blanks through said frame and operable to cause side panels of cartons forced through said frame to be folded inwardly upon movement through said frame.

6. A machine for erecting flat cut and scored corrugated blanks into formed trays, said machine comprising a magazine, a carton feed station, and a carton erection station, said magazine being operable to supply carton blanks to said carton feed station, and said feed station being operable to sequentially supply carton blanks to said erection station, the improvement wherein:
said magazine includes a conveyor for transporting flat carton blanks on edge to said carton feed station and for aligning cartons at said station,
said conveyor comprising a pair of generally horizontal, parallel lead screws having threads formed thereon, said threads being operable upon rotation to feed the edge of said carton blanks forwardly,
drive means for independently rotating said lead screws, and
control means for controlling rotation of said lead screws so as to effect alignment of carton blanks at said feed station, said control means including a feeler element located adjacent the forward end of each of said lead screws in the path of movement of carton blanks moved over said lead screws, each feeler element being operably connected to the drive means of the lead screw adjacent which it is located so that it is operable to stop rotation of said lead screw when a carton is aligned and engaged therewith.

7. The machine of claim 6 wherein said drive means includes an electric motor and said feeler elements comprise a pair of electrical control switches.

8. The machine of claim 6 wherein said drive means for independently rotating said lead screws comprises a single electrical motor operable to drive said screws through a pair of electric clutches, each of said feeler elements being operatively connected to said electric clutches so as to cause the clutch to be engaged or disengaged depending upon the condition of the feeler associated therewith.

9. The machine of claim 8 wherein said feeler elements comprise a pair of electrical control switches.

10. A machine for erecting flat cut and scored corrugated blanks into formed trays, said machine comprising a magazine, a carton feed station, and a carton erection station, said magazine being operable to supply carton blanks while said blanks are located in a generally vertical plane and are supported on a bottom edge to said carton feed station and said feed station being operable to sequentially supply carton blanks to said erection station, the improvement wherein:
- said feed station includes a suction cup engageable with the forwardmost carton in said magazine,
- means for reciprocating said suction cup relative to said forward end of said magazine so as to enable said suction cup to be moved toward said magazine and into engagement with the first carton in said magazine and, while engaged with said forwardmost carton in said magazine, to move away from said magazine so as to extract said carton from said magazine,
- movable means for supporting the upper edge of the forwardmost carton in said magazine, and
- means for moving said upper edge supporting means away from said forwardmost carton at a rate faster than said cartons can move forwardly therewith so that said upper edge supporting means is moved out of engagement therewith in synchronization with movement of said suction cup away from the forward end of said magazine so as to enable said forwardmost carton to be moved downwardly out of engagement with said upper edge supporting means as said forwardmost carton is extracted from said magazine.

11. The machine of claim 10 wherein the means for reciprocating said suction cup relative to said forward end of said magazine comprises a cam follower operatively connected to said suction cup, a cam track through which said follower is movable and a motor for causing said suction cup and connected follower to reciprocate relative to said cam track, said suction cup being movable while engaged with said forwardmost carton in said magazine away from said magazine and simultaneously downwardly so as to cause said carton to be extracted from said magazine and moved downwardly relative thereto while said carton blank is engaged with said suction cup.

12. The machine of claim 11 wherein said suction cup reciprocating means includes a fluid motor for effecting movement of said cam follower relative to said cam track.

13. The machine of claim 10 wherein the means for moving said upper edge supporting means away from the forwardmost carton in said magazine comprises a fluid motor.

14. The machine of claim 10 wherein said means for moving said upper edge supporting means away from said forward end of said magazine is further operable to move said upper edge supporting means toward said magazine after said forwardmost carton is extracted therefrom so as to push the upper edge of the next following carton rearwardly after extraction of the forwardmost carton from said magazine.

15. The machine of claim 14 wherein said upper edge supporting means is moved rearwardly at a slower rate than it is moved forwardly by said upper edge moving means, said upper edge supporting means being moved forwardly at a faster rate than the cartons fall forwardly therewith so that said upper edge supporting means is disengaged from said forwardmost carton while being moved forwardly.

16. A carton erection machine comprising:
- a pair of magazines, one of said magazines being operable to supply flat cut and scored carton bottom blanks to a carton feed station and the other magazine being operable to supply flat cut and scored carton lid blanks to a second carton feed station,
- means at each of said stations to sequentially feed cartons from said magazines into a pair of carton erection stations,
- a pair of forming mandrels and a pair of carton erection frames, each of said mandrels being cooperable with one of said carton erection frames at one of said carton erection stations to erect a flat carton blank into a tray as said mandrel is moved relative to said frame,
- means for reciprocating said mandrels so as to alternately move said mandrels through said frames and thereby sequentially erect a blank at first one erection station and then subsequently at the other station, and
- a pair of stapling stations, each of said stapling stations being located adjacent one of said erection stations and in the path of movement of erected carton trays as they move through said frames, at least a pair of staplers movably mounted at each of said stations and means for moving said staplers into said cartons as they pass through said stapling stations so as to staple said cartons in an erected condition, said forming mandrels remaining in said erected carton trays and serving as anvils for said staplers as said staplers insert staples through said erected cartons.

17. The carton erection machine of claim 16 wherein said carton erection station comprises two pair of staplers movably mounted at said stapling station, each of said pairs of staplers being located on opposite sides of said carton and mechanical drive mechanisms interconnecting said staplers and operative to cause said staplers to be moved relative to a carton so as to insert staples into an erected carton as it is moved through said stapling station.

18. The carton erection machine of claim 17 wherein said mechanical drive mechanism comprises a pair of drive shafts, means drivingly connecting two of said staplers to each of said shafts, and mechanical linkage means interconnecting said shafts and including means for causing said shafts to simultaneously pivot and thereby move the attached pairs of staplers into the carton at said station.

19. A carton erection machine comprising:
- a pair of end-to-end aligned magazine feed conveyors, each of said conveyors being operable to supply flat cut and scored carton blanks rectilinearly in a horizontal direction to a pair of opposed carton feed stations,
- means at each of said stations to sequentially feed cartons from said magazine feed conveyors vertically into a pair of opposed carton erection stations,
- a unitary solid reciprocal member located between said opposed carton erection stations, said member having a pair of mandrels fixedly mounted upon its opposite ends,
- a pair of carton erection frames, each of said mandrels being cooperable with one of said carton erection frames at each of said stations to erect a flat carton blank into a tray as said mandrel is moved relative to said frame, and
- means for reciprocating said member in a horizontal direction parallel to the path of said aligned conveyors so as to alternately move said mandrels through said frames and thereby sequentially erect a blank at first one station as the member moves in one direction and then subsequently at the other station as the member moves in the opposite direction.

UNITED STATES PATENT OFFICE
CERTIFICATE OF CORRECTION

Patent No. 3,583,295      Dated June 8, 1971

Inventor(s) Stanley C. Elder et al

It is certified that error appears in the above-identified patent and that said Letters Patent are hereby corrected as shown below:

Column 3, line 42, change "53" to -- 43 --.

Column 6, line 39, change "barton" to -- carton --.

Column 15, line 65, change "Cr9-3" to -- CR9-3 --.

Column 15, line 72, change "ID1-1" to -- TD1-1 --.

Signed and sealed this 28th day of December 1971.

(SEAL)
Attest:

EDWARD M. FLETCHER, JR.　　　　　ROBERT GOTTSCHALK
Attesting Officer　　　　　　　　Acting Commissioner of Patents